(12) United States Patent
Iwaki

(10) Patent No.: US 8,459,398 B2
(45) Date of Patent: Jun. 11, 2013

(54) WHEEL MOTOR DEVICE

(75) Inventor: Koji Iwaki, Hyogo (JP)

(73) Assignee: Kanzaki Kokyukoki Mfg. Co., Ltd., Hyogo (JP)

( * ) Notice: Subject to any disclaimer, the term of this patent is extended or adjusted under 35 U.S.C. 154(b) by 0 days.

(21) Appl. No.: 13/537,552

(22) Filed: Jun. 29, 2012

(65) Prior Publication Data

US 2012/0261201 A1 Oct. 18, 2012

Related U.S. Application Data

(62) Division of application No. 12/369,121, filed on Feb. 11, 2009, now abandoned.

(30) Foreign Application Priority Data

Feb. 13, 2008 (EP) ...................................... 08151379

(51) Int. Cl.
*B60K 7/00* (2006.01)
(52) U.S. Cl.
USPC .......................................................... 180/308
(58) Field of Classification Search
USPC ....................................... 180/305, 308, 65.51
See application file for complete search history.

(56) References Cited

U.S. PATENT DOCUMENTS

| | | |
|---|---|---|
| 2,287,498 A | 6/1942 | Scofield |
| 2,430,528 A | 11/1947 | Moon |
| 3,170,534 A | 2/1965 | Kelley et al. |
| 3,800,901 A | 4/1974 | Blomstrom et al. |
| 4,315,441 A | 2/1982 | Fukuda |
| 4,696,164 A | 9/1987 | Giere |
| 4,781,259 A | 11/1988 | Yamaoka et al. |
| 4,809,796 A | 3/1989 | Yamaoka et al. |
| 5,392,670 A | 2/1995 | Hauser |
| 5,850,886 A | 12/1998 | Kouno et al. |
| 6,006,870 A | 12/1999 | Gazyakan et al. |
| 6,125,954 A | 10/2000 | Oota et al. |
| 6,578,656 B2 | 6/2003 | Samejima et al. |
| 6,913,102 B2 | 7/2005 | Sugata et al. |

(Continued)

FOREIGN PATENT DOCUMENTS

| | | |
|---|---|---|
| EP | 1 413 398 A2 | 4/2004 |
| JP | 2005-028914 | 2/2005 |

(Continued)

OTHER PUBLICATIONS

European Search Report for European Application No. EP 08 15 1379, European Patent Office, mailed Aug. 18, 2008, 3 pgs.

(Continued)

*Primary Examiner* — Katy M Ebner
(74) *Attorney, Agent, or Firm* — Sterne, Kessler, Goldstein & Fox P.L.L.C.

(57) ABSTRACT

A wheel motor device applicable to a working vehicle including a driving power source, a hydraulic pump main body operatively driven by the driving source and a driving wheel, the wheel motor device comprising a hydraulic motor main body forming an HST in cooperation with the hydraulic pump main body, a motor shaft supporting the hydraulic motor main body in a relatively non-rotatable manner with respect thereto, an output member outputting toward the driving wheel the rotational power that has been operatively transmitted from the motor shaft, and a casing accommodating the hydraulic motor main body and supporting the motor shaft and the output member.

4 Claims, 16 Drawing Sheets

U.S. PATENT DOCUMENTS

| | | |
|---|---|---|
| 6,983,815 B2 | 1/2006 | Abend et al. |
| 7,090,045 B2 | 8/2006 | Okada et al. |
| 7,231,765 B2 * | 6/2007 | Kawamura et al. ............. 60/487 |
| 7,431,124 B2 * | 10/2008 | White, Jr. ....................... 180/307 |
| 7,610,986 B2 * | 11/2009 | Ohashi ........................... 180/305 |
| 7,690,470 B2 | 4/2010 | Iwaki et al. |
| 7,694,765 B2 | 4/2010 | Kitagawara et al. |
| 7,708,104 B2 * | 5/2010 | Ohashi et al. ................. 180/305 |
| 7,798,259 B2 | 9/2010 | Iida et al. |
| 7,971,675 B2 | 7/2011 | Ishii et al. |
| 2005/0211494 A1 | 9/2005 | Okada et al. |
| 2007/0107953 A1 | 5/2007 | Abend et al. |
| 2008/0099269 A1 | 5/2008 | Sakikawa |

FOREIGN PATENT DOCUMENTS

| | | |
|---|---|---|
| JP | 2005-195070 | 7/2005 |
| JP | 2006-096112 | 4/2006 |
| WO | WO 00/35698 | 6/2000 |

OTHER PUBLICATIONS

European Search Opinion for European Application No. EP 08 15 1379, European Patent Office, mailed Aug. 18, 2008, 2 pgs.

* cited by examiner

WHEEL MOTOR DEVICE

CROSS-REFERENCE TO RELATED APPLICATIONS

This application is a divisional of U.S. application Ser. No. 12/369,121, filed Feb. 11, 2009, now pending, the disclosure of which is hereby incorporated by reference in its entirety.

BACKGROUND OF THE INVENTION

1. Field of the Invention

The present invention relates to a wheel motor device which has a hydraulic motor main body forming an HST in cooperation with a hydraulic pump main body that is operatively driven by a drive source and which is placed separately from the hydraulic pump main body such that it can be positioned close to a corresponding driving wheel.

2. Related Art

There has been conventionally known a wheel motor device which has a hydraulic motor main body forming an HST in cooperation with a hydraulic pump main body that is operatively driven by a drive source and which is placed separately from the hydraulic pump main body such that it can be positioned close to a corresponding driving wheel (see, for example, Japanese Unexamined Patent Publication No. 2006-096112, Japanese Unexamined Patent Publication No. 2005-195070, and Japanese Unexamined Patent Publication No. 2005-028914, which are hereinafter referred to as prior document 1 to 3, respectively).

The wheel motor device can be preferably used in a working vehicle such as a mid-mount mower tractor which is required to ensure a free space between a pair of driving wheels usable as an installation space for a rear discharge duct and the like.

More specifically, the wheel motor devices described in the prior documents 1 to 3 include a speed-reduction gear mechanism for reducing a speed of the rotational power output from the hydraulic motor main body, an output member for outputting the rotational power whose rotational speed has been reduced by the speed-reduction gear mechanism to the corresponding driving wheel, and a brake mechanism capable of operatively and selectively applying a braking force to the output member, in addition to the hydraulic motor main body fluidly connected to the hydraulic pump main body.

Since the conventional wheel motor devices include the speed-reduction gear mechanism, it is possible to employ a high-rotation/low-torque type hydraulic motor main body as the hydraulic motor main body. This can reduce the size of the hydraulic motor main body and also can reduce the leak of the hydraulic fluid from the hydraulic motor main body, thereby enhancing power transmission efficiency of the HST.

Meanwhile, it is desirable to reduce the size of the wheel motor device including the above-described components with respect to the direction of the rotational axis line of the corresponding driving wheel (namely, in the widthwise direction of the working vehicle).

Namely, by reducing the size of the wheel motor device in the direction of the rotational axis line, it is possible to ensure the free space between the pair of driving wheels as much as possible.

Further, the wheel motor device is desired to reduce the size of the brake mechanism as much as possible, while increasing the degree of freedom in designing the brake mechanism.

However, there exists no wheel motor device capable of attaining the above-described two requirements at the same time.

Specifically, the wheel motor device described in the prior document 1 includes a motor shaft positioned inwards in the vehicle widthwise direction than the corresponding driving wheel with being parallel to the rotational axis line of the corresponding driving wheel, a hydraulic motor main body supported on the motor shaft in a relatively non-rotatable manner, a speed-reduction gear mechanism operatively connected to an outer end portion of the motor shaft in the vehicle-widthwise direction (the end portion on as side close to the driving wheel), an output member for outputting the rotational power inputted from the speed-reduction gear mechanism to the driving wheel, and a brake mechanism positioned inwards in the vehicle-widthwise direction than the hydraulic motor main body in such a way as to selectively apply a braking force to an inner end portion of the motor shaft in the vehicle-widthwise direction (the end portion on a side away from the driving wheel).

Since the wheel motor device described in the prior document 1 is configured so that the brake mechanism applies the braking force to the motor shaft which is positioned on an upstream side in a power transmission direction than the speed-reduction gear mechanism, it is possible to achieve a reduction of the brake capacity required for the brake mechanism, thereby reducing the size of the brake mechanism.

However, the brake mechanism is positioned inwards in the vehicle-widthwise direction than the hydraulic motor main body, thereby inducing the problem that the free space between the pair of driving wheels is reduced due to the presence of the brake mechanism.

The wheel motor device described in the prior document 2 includes a motor shaft placed positioned inwards in the vehicle-widthwise direction than the corresponding driving wheel with being parallel to the rotational axis line of the corresponding driving wheel, a hydraulic motor main body supported on the motor shaft in a relatively non-rotatable manner, a speed-reduction gear mechanism operatively connected to an outer end of the motor shaft in the vehicle-widthwise direction, an output member for outputting the rotational power inputted from the speed-reduction gear mechanism to the driving wheel, and a brake mechanism inserted between the speed-reduction gear mechanism and the outer end of the motor shaft in the vehicle-widthwise direction, in the direction of the rotational axis line (in the vehicle-widthwise direction) in such a way as to selectively and operatively apply a braking force to the output member.

Since the wheel motor device described in the prior document 2, similarly to the wheel motor device described in the prior document 1, is configured so that the brake mechanism applies the braking force to the motor shaft which is positioned on an upstream side in a power transmission direction than the speed-reduction gear mechanism, it is possible to achieve a reduction of the brake mechanism in size.

However, the brake mechanism is positioned between the motor shaft and the speed-reduction gear mechanism with respect to the vehicle-widthwise direction, thereby inducing the problem that the free space between the pair of driving wheels is reduced due to the presence of the brake mechanism.

The wheel motor device described in the prior document 3 includes a motor shaft positioned inwards in the vehicle-widthwise direction than the corresponding driving wheel with being parallel to the rotational axis line of the corresponding driving wheel, a hydraulic motor main body supported on the motor shaft in a relatively non-rotatable manner, a speed-reduction gear mechanism operatively connected to an outer end of the motor shaft in the vehicle-widthwise direction, an output member for outputting the rotational power inputted from the speed-reduction gear mechanism to the driving wheel, and a brake mechanism configured so as to selectively apply a braking force to an intermediate shaft in the speed-reduction gear mechanism.

More specifically, the speed-reduction gear mechanism includes the intermediate shaft which is placed at a position displaced from both the motor shaft and the output member with being parallel to both the shafts, a first speed-reduction gear train for performing primary speed-reduction between the motor shaft and the intermediate shaft, and a second speed-reduction gear train for performing secondary speed-reduction between the intermediate shaft and the output member.

Further, the brake mechanism is positioned so as to selectively and operatively apply the braking force to the outer end portion of the intermediate shaft in the vehicle-widthwise direction (the end portion on a side away from the driving wheel).

Since the motor wheel device described in the prior document 3, the brake mechanism is configured so as to apply the braking force to the intermediate shaft displaced from the motor shaft, it is possible to prevent the wheel motor device from being lengthened in the vehicle-widthwise direction (in the direction of the axis line of the motor shaft) due to the provision of the brake mechanism, thereby preventing the occurrence of the problem that the free space between the pair of driving wheels is reduced due to the presence of the brake mechanism.

However, in the wheel motor device described in the prior document 3, the position at which the brake mechanism is placed depends on the position of the intermediate shaft in the speed-reduction gear mechanism, thereby degrading the degree of freedom in designing the brake mechanism.

Further, in the prior document 3, the speed-reduction gear mechanism applies the braking force to the intermediate shaft which is rotated at a rotational speed which has been reduced from the rotational speed of the motor shaft by the first speed-reduction gear train.

This structure induces the problem that the brake capacity of the brake mechanism cannot be sufficiently reduced.

BRIEF SUMMARY OF THE INVENTION

The present invention is made in view of the above-described conventional techniques, and it is an object to provide a wheel motor device including a hydraulic motor main body, a motor shaft, a speed-reduction gear mechanism, an output member and a brake mechanism, the wheel motor device capable of reducing the size of the brake mechanism as much as possible without degrading the degree of freedom in designing the brake mechanism.

The present invention provides, in order to achieve the object, a wheel motor device applied in a working vehicle including a driving power source, a hydraulic pump main body operatively driven by the driving source and a pair of first and second driving wheels facing to each other along a widthwise direction of the vehicle, the wheel motor device including a hydraulic motor main body that forms an HST in cooperation with the hydraulic pump main body, a motor shaft that supports the hydraulic motor main body in a relatively non-rotatable manner, a speed-reduction gear mechanism for reducing the speed of the rotational power output from the motor shaft, a first output member for outputting the rotational power whose speed has been reduced by the speed-reduction gear mechanism toward the corresponding first driving wheel, a casing that accommodates the hydraulic motor main body and the speed-reduction gear mechanism, and a brake mechanism that selectively and operatively applies a brake force to the first output member, the wheel motor device being characterized in that the brake mechanism includes a brake shaft supported by the casing, a speed-increasing gear mechanism for increasing the speed of the rotational power output from the motor shaft and operatively transmitting the same to the brake shaft, and a brake unit for selectively and operatively applying the brake force to the brake shaft.

Since the wheel motor device according to the present invention is configured so as to apply the brake force to the brake shaft having a rotational power whose speed is increased by the speed-increasing gear mechanism with respect to the rotational power of the first output member, it is possible to reduce the size of the brake mechanism.

Furthermore, the wheel motor device makes it possible to freely position the brake shaft, independently of a power transmission path from the motor shaft to the first output member through the speed-reduction gear mechanism, thereby enhancing the degree of freedom in designing the break mechanism.

In one embodiment, the casing may include a motor case which supports the motor shaft at a position displaced from a rotational axis line of the first driving wheel in such a manner that the motor shaft is substantially parallel to the rotational axis line of the first driving wheel and is rotatable around its axis line and which accommodates the hydraulic motor main body supported by the motor shaft, and a gear case connected to a side of the motor case which is close to the first driving wheel, the gear case supporting the first output shaft so as to be positioned coaxially with the rotational axis line of the first driving wheel in a state of being rotatable manner around its axis line and accommodating the speed-reduction gear mechanism.

In the configuration, the brake shaft is supported in a rotatable manner around its axis line by the gear case at a position displaced from the first driving wheel around the rotational axis line of the first driving wheel, in such a manner that the brake shaft is substantially parallel to the rotational axis line of the first driving wheel and an end portion of the brake shaft on a side away from the first driving wheel is extended outward from the gear case.

The brake unit includes a brake disk supported by the outwardly-extending end portion of the brake shaft in a relatively non-rotatable manner, and is configured so as to selectively apply the brake force to the brake disk on the basis of an operation from the outside.

According to the one embodiment, it is possible to prevent the wheel motor device from being enlarged with respect to a direction along the rotational axis lines of the first and second driving wheels due to the provision of the brake mechanism, thereby ensuring a free space between the pair of first and second driving wheels as much as possible.

In the one embodiment, the gear case is preferably configured to be capable of supporting the brake shaft at plural positions around the rotational axis line of the first output member.

According to the configuration, it is possible to enhance the degree of freedom in positioning the brake mechanism.

More preferably, the plural positions may include first and second portions which are symmetrical to each other with an imaginary vertical plane as a reference, the imaginary vertical plane passing through the rotation axis line of the first output member.

According to the configuration, it is possible to have the brake shaft in a first wheel motor device for driving the first driving wheel and the brake shaft in a second wheel motor device for driving the second driving wheel positioned coaxially with each other while employing a pair of wheel motor devices having the same configurations to each other as the first and second wheel motor devices.

In the various configurations in the one embodiment, the brake unit preferably includes a mounting stay detachably connected to the gear case, a brake operation shaft supported in a rotatable manner around its axis line by the mounting stay in a state that its axis line extends substantially parallel to a disk surface of the brake disk and its first end portion having a non-circular cross-sectional shape overlaps with the brake disk as viewed along the rotational axis line of the brake disk, and a push-side brake pad supported by the first end portion in such a manner as to come close to or separate from the brake disk in accordance with the rotation of the brake operation shaft about the axis line.

More preferably, the brake unit may further include a fixed-side brake pad detachably supported by the gear case in such a manner as to face to the push-side brake pad across the brake disk.

In the above various configurations in the one embodiment, the wheel motor device preferably further include a brake-shaft-side coupling supported in a relatively non-rotatable manner by a portion of the brake shaft which is away from the first driving wheel than the brake disk. The brake-shaft-side coupling has a concave/convex engagement portion at an end surface on a side opposite from the corresponding first driving wheel, the concave/convex engagement portion being opened toward the other second driving wheel.

In the above various configurations, the wheel motor device may further include a second output member which is operatively connected trough the speed-reduction gear mechanism to the motor shaft and which outputs a driving force toward the second driving wheel.

In one embodiment, the first and second output members may be positioned coaxially with each other.

In the configuration, the wheel motor device may further include a differential gear mechanism that includes a ring gear operatively connected to the motor shaft, first and second side bevel gears respectively supported on the first and second output members in a relatively non-rotatable manner, a pinion shaft rotating along with the ring gear, and a bevel pinion supported on the pinion shaft in a relatively rotatable manner in a state of being engaged with the first and second side bevel gears.

A driving-side gear with a small diameter provided on the motor shaft so as to engage with the ring gear forms the speed-reduction gear mechanism in cooperation with the ring gear, and a driven-side gear with a small diameter provided on the brake shaft so as to engage with the ring gear forms the speed-increasing gear mechanism in cooperation with the ring gear.

According to the configuration, it is possible to differentially drive the first and second driving wheels only by providing the single wheel motor device.

Preferably, the motor shaft is displaced from the rotational axis line in a state of being substantially parallel to the rotational axis line, and the first output member is disposed coaxially with the rotational axis line of the first driving wheel.

In the arrangement, the speed-reduction gear mechanism includes a driving-side gear with a small diameter which is provided on the motor shaft in a relatively non-rotatable manner, and an output gear with a large diameter which is provided on the first output member in a relatively non-rotatable manner and which is engaged with the driving-side gear, the output gear being embodied by an internal gear. The brake shaft is provided with a driven-side gear with a small diameter which is engaged with the output gear. The output gear and the driven-side gear form the speed-increasing gear mechanism.

According to the configuration, it possible to have the positions of the axis lines of the motor shaft and the brake shaft come close to the position of the axis line of the first output member while sufficiently ensuring a speed reducing ratio of the speed-reduction gear mechanism and a speed increasing ratio of the speed-increasing gear mechanism, thereby realizing, miniaturization of the wheel motor device in a radial direction.

BRIEF DESCRIPTION OF THE DRAWINGS

The above, and other objects, features and advantages of the present invention will become apparent from the detailed description thereof in conjunction with the accompanying drawings wherein.

DETAILED DESCRIPTION OF THE PREFERRED EMBODIMENTS

First Embodiment

Hereinafter, a preferred embodiment of a wheel motor device according to the present invention will be described, with reference to the attached drawings.

First, there will be described an embodiment of a working vehicle 1A to which wheel motor devices 300A according to the present embodiment are applied.

Figure 1:
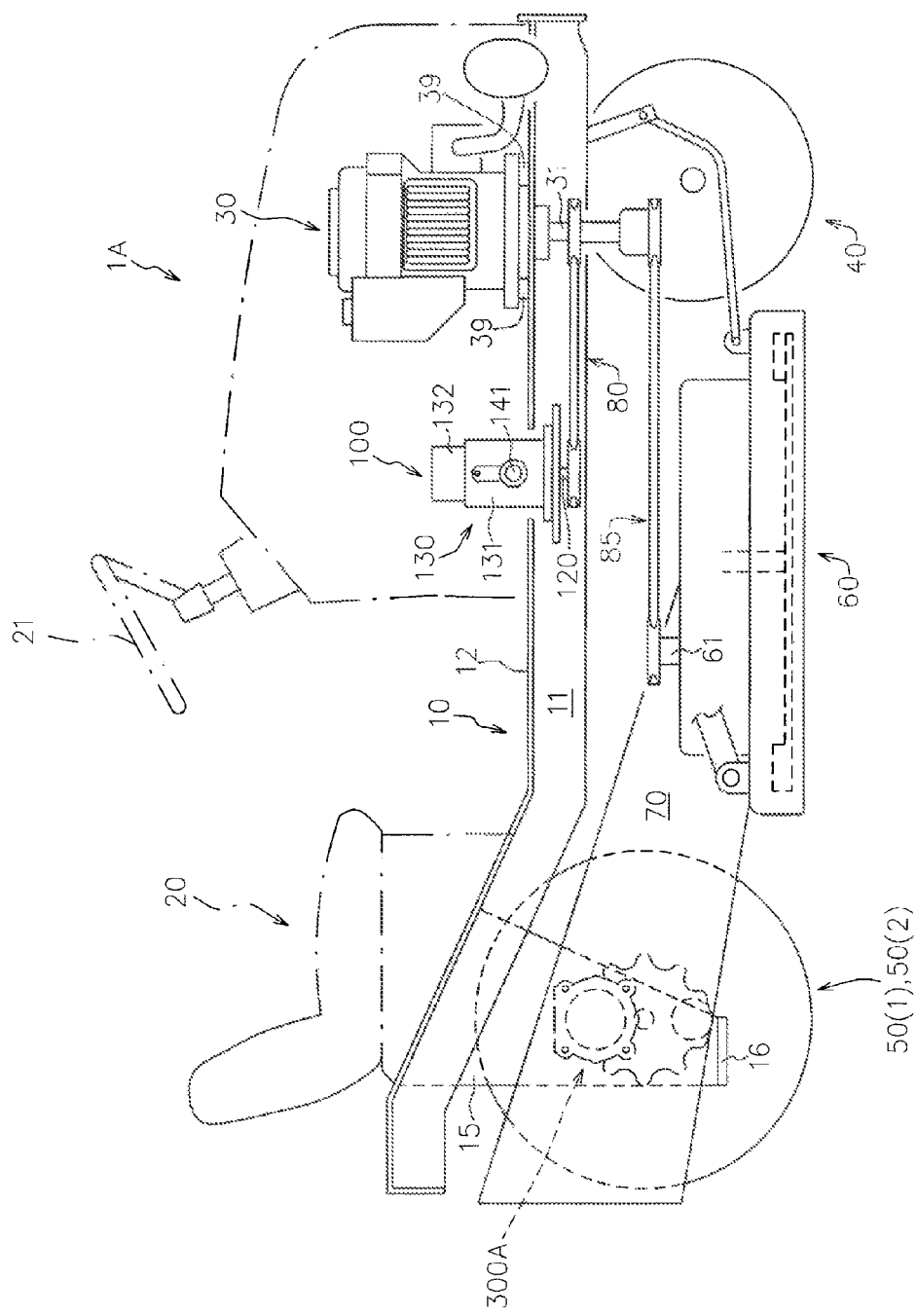
FIG. 1 is a schematic side view of a working vehicle to which a wheel motor device according to a first embodiment of the present invention is applied.
Figure 2:
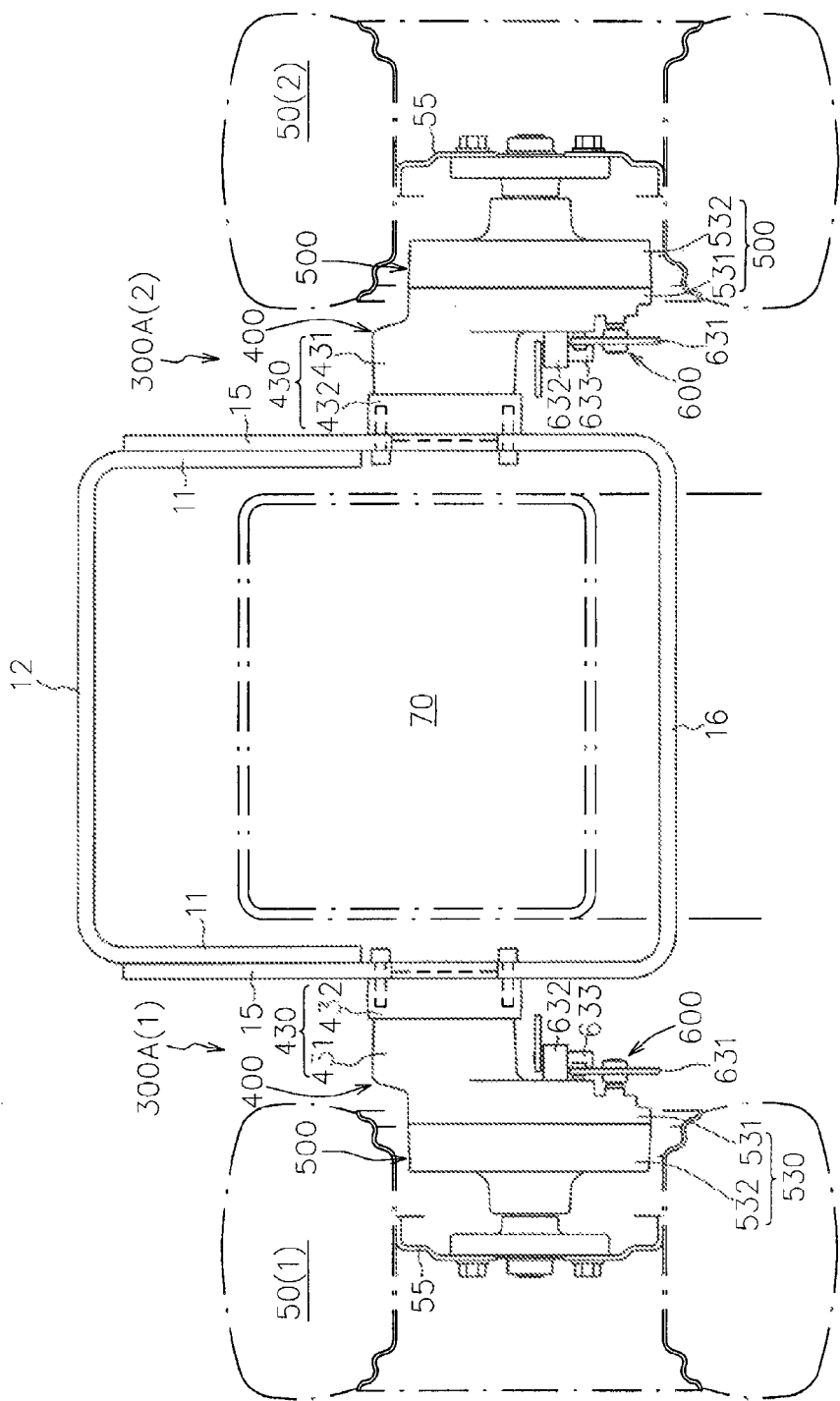
FIG. 2 is a schematic rear view of the working vehicle shown in FIG. 1.
Figure 3:
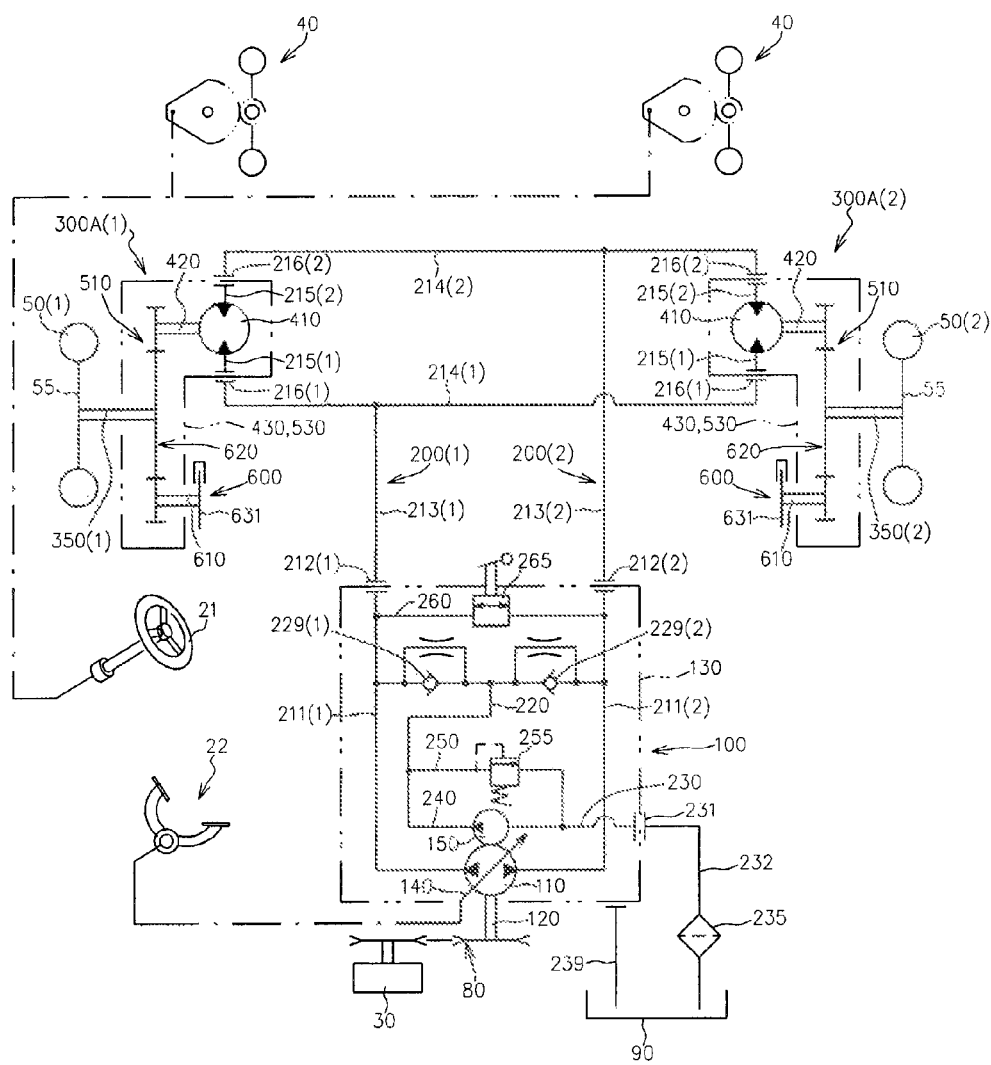
FIG. 3 is a hydraulic circuit diagram of the working vehicle shown in FIGS. 1 and 2.

FIGS. 1 to 3 respectively illustrate a schematic side view, a schematic rear view and a hydraulic circuit diagram of the working vehicle 1A.

As illustrated in FIG. 1 and FIG. 2, the working vehicle 1A is formed to be a mid-mount mower tractor having a mower device 60 at the center in the lengthwise direction of the vehicle and also having a rear discharge duct provided between a pair of driving wheels 50(1) and 50(2).

Specifically, the working vehicle 1A includes a vehicle frame 10 having a pair of main frames 11 that extends along the vehicle-lengthwise direction, a driver's seat 20 supported by the vehicle frame 10, a driving power source 30 supported by the vehicle frame 10, a pair of non-driving wheels 40 (front wheels in the present embodiment) and a pair of driving wheels 50(1), 50(2) (rear wheels in the present embodiment) respectively positioned on one side and the other side in the vehicle-lengthwise direction, the mower device 60 positioned between the non-driving wheels 40 and the driving wheels 50(1), 50(2) with respect to the vehicle lengthwise direction, a discharge duct 70 positioned between the pair of driving wheels 50(1), 50(2) in order to guide the grass cut by the working machine to the outsides (rearward in the present embodiment), a hydraulic pump unit 100 including a hydraulic pump main body 110 operatively driven by the driving power source 30, the pair of wheel motor devices 300A(1), 300A(2) which are positioned away from the hydraulic pump unit 100 so as to be close to the corresponding driving wheels 50(1), 50(2) and which include hydraulic motor main body 410 fluidly connected to the hydraulic pump main body 110 through a pair of first and second hydraulic fluid lines 200(1), 200(2) so as to form an HST in cooperation with the hydraulic pump main body 110.

Further, in the present embodiment, as illustrated in FIG. 3, the hydraulic motor main bodies 410 in the pair of wheel motor devices 300A(1) and 300A(2) are fluidly connected in parallel to the hydraulic pump main body 110 in the hydraulic pump unit 100.

Namely, the hydraulic motor main bodies 410 in the pair of wheel motor devices 300A(1) and 300B(2) are differentially driven by the hydraulic pump main body 100 by means of hydraulic effect.

Accordingly, as illustrated in FIG. 1 and FIG. 3, in the present embodiment, the non-driving wheels 40 are formed to be steering wheels steered by a steering operation member 21, such as a steering wheel, which is provided at the front of the driver's sheet 20.

As illustrated in FIG. 1, the driving power source 30 is supported in a vibration-preventing manner on the vehicle frame 10 through vibration-preventing rubbers 39.

More specifically, the vehicle frame 10 has, in addition to the pair of main frames 11, a cross member 12 which couples the pair of main frames to each other, wherein the driving power source 30 is supported in a vibration-preventing manner on the cross member 12 through the vibration-preventing rubbers 39.

In the present embodiment, the driving power source 30 is of a vertical crank shaft type in which an output shaft 31 extends vertically. The driving power source 30 is supported on the upper surface of the cross member 12 through the vibration-preventing rubbers 39 at a state where a tip end portion of the output shaft 31 extends below the cross member 12 through an opening formed at the cross member 12.

As illustrated in FIG. 1 and FIG. 3, the output shaft 31 is operatively connected to a pump shaft 120, which will be described later, in the hydraulic pump unit 100, through a traveling-system transmission mechanism 80 such as a pulley-and-belt transmission mechanism, and, also, is operatively connected to an input shaft 61 of the mower device 60 through a PTO-system transmission mechanism 85 such as a pulley-and-belt transmission mechanism.

Further, as a matter of cause, it is also possible to employ, as the driving power source 30, a driving power source of a horizontal crank shaft type, instead of the vertical crank shaft type.

As illustrated in FIG. 1 to FIG. 3, the hydraulic pump unit 100 includes the pump shaft 120 which is operatively driven by the driving power source 30, the hydraulic pump main body 110 supported by the pump shaft 120 in a relatively non-rotatable manner, and a pump case 130 which supports the pump shaft 120 in a rotatable manner around the axis line and also accommodates the hydraulic pump main body 110.

In the present embodiment, the hydraulic pump main body 110 is of an axial piston type. Namely, the hydraulic pump main body 110 includes a pump-side cylinder block (not illustrated) supported by the pump shaft 120 in a relatively non-rotatable manner, and plural pump-side pistons (not illustrated) which are accommodated in the pump-side cylinder block in a relatively non-rotatable manner around the axis line of the pump shaft and in a reciprocating manner along the axis line.

As described above, the hydraulic pump main body 110 and the hydraulic motor main bodies 410 form an HST.

Accordingly, at least one of the hydraulic pump main body 110 and the hydraulic motor main bodies 410 is formed to be of a variable displacement type in which its suction/discharge amount could be changed.

As illustrated in FIG. 3, in the present embodiment, the hydraulic pump main body 110 is of a variable displacement type, while the hydraulic motor main bodies 410 are of a fixed displacement type.

Accordingly, as illustrated in FIG. 3, the hydraulic pump unit 100 has a displacement adjustment mechanism 140 for changing the suction/discharge amount of the hydraulic pump main body 110, in addition to the above-described components.

The displacement adjustment mechanism 140 may include a movable swash plate (not illustrated) which directly or indirectly engages with free end portions of the pump-side pistons to define the range in which the pump-side pistons reciprocates, and a control shaft 141 (see FIG. 1) which can be operated from the outside to slant the movable swash plate.

The control shaft 141 is supported by the pump case 130 in a rotatable manner around the axis line, and the movable swash plate is slanted in accordance with the rotation of the control shaft 141 about the axis line.

Namely, the control shaft 141 is supported by the pump case 130 in a rotatable manner around the axis line, in a state where its inner end portion is operatively connected to the movable swash plate and its outer end portion can be operated from the outside.

Further, the outer end portion of the control shaft 141 is operatively connected to a speed-changing operation member 22 (see FIG. 3) such as a speed-changing pedal positioned in a vicinity of the driver's sheet 20, so that the control shaft 141 is rotated about the axis line in accordance with a manual operation on the speed-changing operation member 22.

In the present embodiment, the movable swash plate is configured so that it can be slanted in both a forward direction and a rearward direction across a neutral position.

Namely, when the speed-changing operation member 22 is operated in a forward side and a rearward side, the control shaft 141 is rotated in one direction and the other direction about the axis line, thereby causing the movable swash plate to be slanted in the forward and rearward directions.

Further, in the present embodiment, the speed-changing operation member 22 is structured to be of a seesaw-pedal type, but it can be of a two-pedal type including a dedicated forward pedal and a dedicated rearward pedal.

As illustrated in FIG. 3, the pump case 130 is formed with various fluid channels including a pair of pump-side hydraulic fluid channels 211 which form portions of the pair of first and second hydraulic fluid lines 200(1) and 200(2).

More specifically, as illustrated in FIG. 1, the pump case 130 includes a hollow shaped pump-side case main body 131 with an opening having a size that allows the hydraulic pump main body 110 to pass therethrough, and a pump-side port block 132 detachably coupled to the pump case main body 131 in such a way as to close the opening in a liquid-tight manner, wherein the fluid channels are formed in the pump-side port block 132.

As illustrated in FIG. 3, the pair of pump-side hydraulic fluid channels 211 include a first pump-side hydraulic fluid channel 211(1) which experiences a higher pressure at a time of a forward movement of the vehicle and a second pump-side hydraulic fluid channel 211(2) which experiences a higher pressure at a time of a rearward movement of the vehicle.

The first pump-side hydraulic fluid channel 211(1) has a first end fluidly connected to the hydraulic pump main body 110 through a first kidney port opened to a contacting surface of the pump-side port block 132 to which the hydraulic pump main body 110 contacts in a rotatable manner, and a second end opened to an outer surface of the pump-side port block 132 to form a first pump-side hydraulic fluid port 212(1).

Similarly, the second pump-side hydraulic fluid channel 211(2) has a first end fluidly connected to the hydraulic pump main body 110 through a second kidney port opened to the contacting surface of the pump-side port block 132 to which the hydraulic pump main body 110 contacts in a rotatable manner and a second end opened to the outer surface of the pump-side port block 132 to form a second pump-side hydraulic fluid port 212(2).

A pair of first and second pump-side hydraulic fluid conduits 213(1), 213(2) which form portions of the pair of first and second hydraulic fluid lines 200(1) and 200(2) are fluidly connected to the first and second pump-side hydraulic fluid ports 212(1) and 212(2), respectively.

Further, in the present embodiment, the working vehicle 1A includes the pair of wheel motor devices 300A(1), 300A(2) for driving the pair of driving wheels 50(1), 50(2), respectively, as described above, and the hydraulic motor main bodies 410 in the pair of wheel motor devices 300A(1) and 300A(2) are fluidly connected in parallel to the single hydraulic pump main body 110.

More specifically, the hydraulic motor main bodies 410 in the pair of wheel motor devices 300A(1) and 300A(2) are fluidly connected to each other through a first motor-side hydraulic fluid conduit 214(1) which experiences a higher pressure at a time of the forward movement of the vehicle and a second motor-side hydraulic fluid conduit 214(2) which experiences a higher pressure at a time of the rearward movement of the vehicle, as illustrated in FIG. 3.

The first and second pump-side hydraulic fluid conduits 213(1), 213(2) are fluidly connected to the first and second motor-side hydraulic fluid conduits 214(1), 214(2), respectively.

Further, as illustrated in FIG. 3, the pump-side port block 132 is formed with a charge fluid channel 220 for replenishing the pair of first and second hydraulic fluid lines 200(1), 200(2) with a hydraulic fluid.

The charge fluid channel 220 has a first end fluidly connected to a hydraulic pressure source and second ends fluidly connected to the pair of first and second pump-side hydraulic fluid channels 211(1), 211(2) through first and second check valves 229(1), 229(2), respectively.

In the present embodiment, as illustrated in FIG. 3, the hydraulic pump unit 100 further includes an auxiliary pump main body 150 which functions as the hydraulic pressure source.

The auxiliary pump main body 150 is driven directly or indirectly by the pump shaft 120.

The auxiliary pump main body 150 has a suction side fluidly connected to a fluid source such as a fluid tank 90 and a discharge side fluidly connected to the charge fluid channel 220.

More specifically, as illustrated in FIG. 3, the pump-side port block 132 is formed with a suction fluid channel 230 having a first end opened to the outer surface of the pump-side port block 132 to form a suction port 231 and a second end fluidly connected to the suction side of the auxiliary pump main body 150, and a discharge fluid channel 240 having a first end fluidly connected to the discharge side of the auxiliary pump main body 150 and a second end fluidly connected to the charge fluid channel 220.

The suction fluid channel 230 is fluidly connected to the fluid source through a suction conduit 232 connected to the suction port 231. In FIG. 3, there are shown a filter 235 inserted in the suction conduit, and a drain conduit 239 for returning the fluid stored in the pump case 130 to the fluid source.

Further, as illustrated in FIG. 3, the pump case 130 is formed with a charge-pressure setting fluid channel 250 in which a relief valve 255 for setting the hydraulic pressure in the charge fluid channel 220 is inserted.

The charge-pressure setting fluid channel 250 has a first end fluidly connected to the suction fluid channel 240 or the charge fluid channel 220 and a second end fluidly connected to the suction fluid channel 230.

Further, the relief valve 255 is inserted in the charge-pressure setting fluid channel 250, in such a manner that its primary side is oriented to the suction fluid channel 240 or the charge fluid channel 220 and the relieved fluid from the relief valve 255 is returned to the suction fluid channel 230.

Further, as illustrated in FIG. 3, the pump-side port block 132 is formed with a bypass fluid channel 260 for communicating the first and second pump-side hydraulic fluid channels 211(1) and 211(2) to each other, and a bypass valve 265 for selectively switching between the communication state and the shutoff state of the bypass fluid channel 260.

By providing the bypass fluid channel 260 and the bypass valve 265, it is possible to effectively prevent the occurrence of a pressure difference between the pair of first and second hydraulic fluid lines 200(1), 200(2) at a time when the working vehicle 1A is forcibly towed in the event of failures of the driving power source 30, the HST or the like, thereby allowing the left and right hydraulic motor main bodies 410 for driving the first and second driving wheels 50(1), 50(2), respectively, to run at idle when forcibly towing.

Hereinafter, the wheel motor devices 300A will be described.

Figure 4:
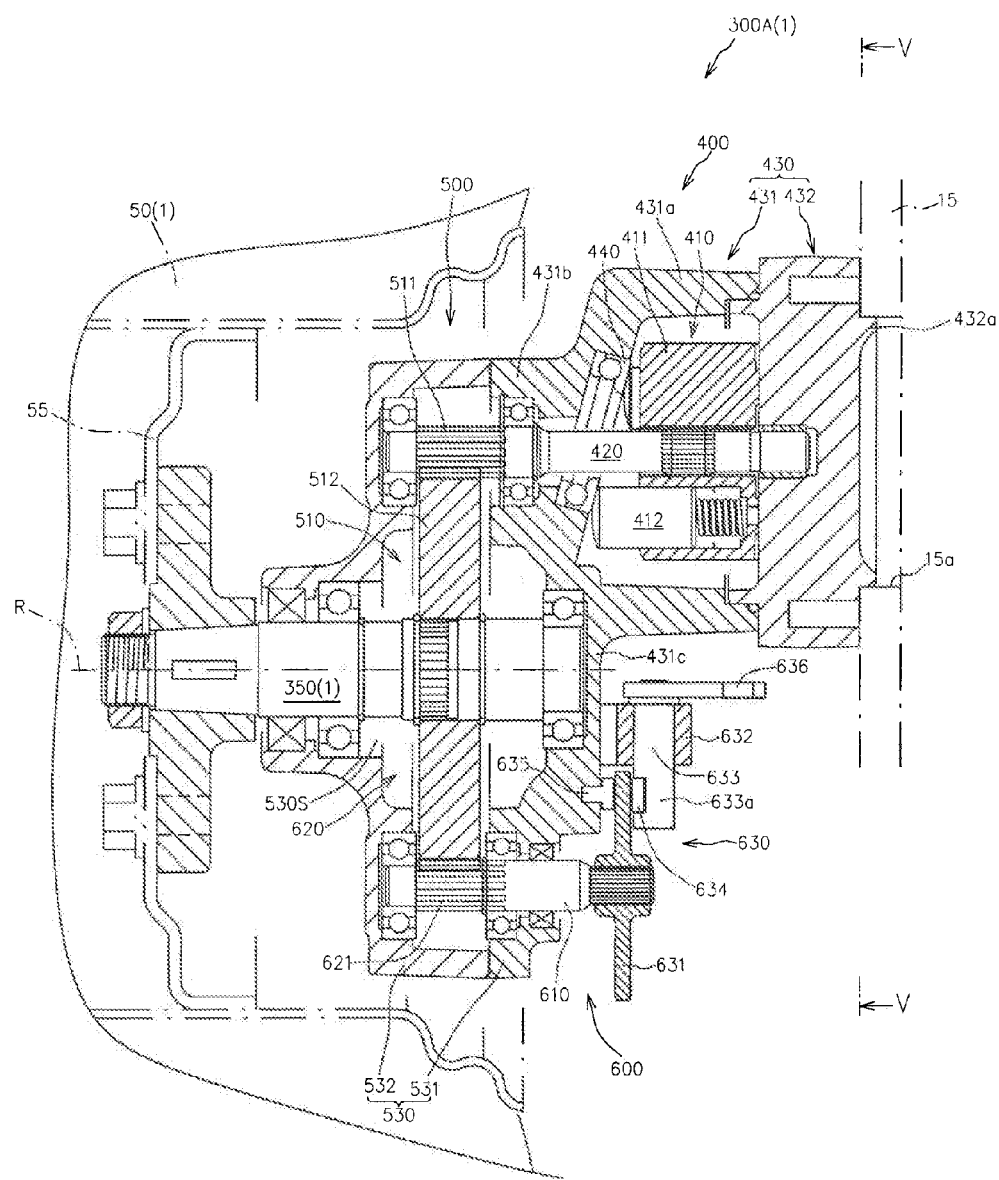
FIG. 4 is a vertical cross-sectional view of the wheel motor device according to the first embodiment.

FIG. 4 illustrates a vertical cross-sectional view of the wheel motor device 300A(1) (hereinafter, referred to as a first wheel motor device) for driving one of the pair of driving wheels 50(1) and 50(2) (hereinafter, referred to as a first driving wheel (50(1))).

Figure 5:
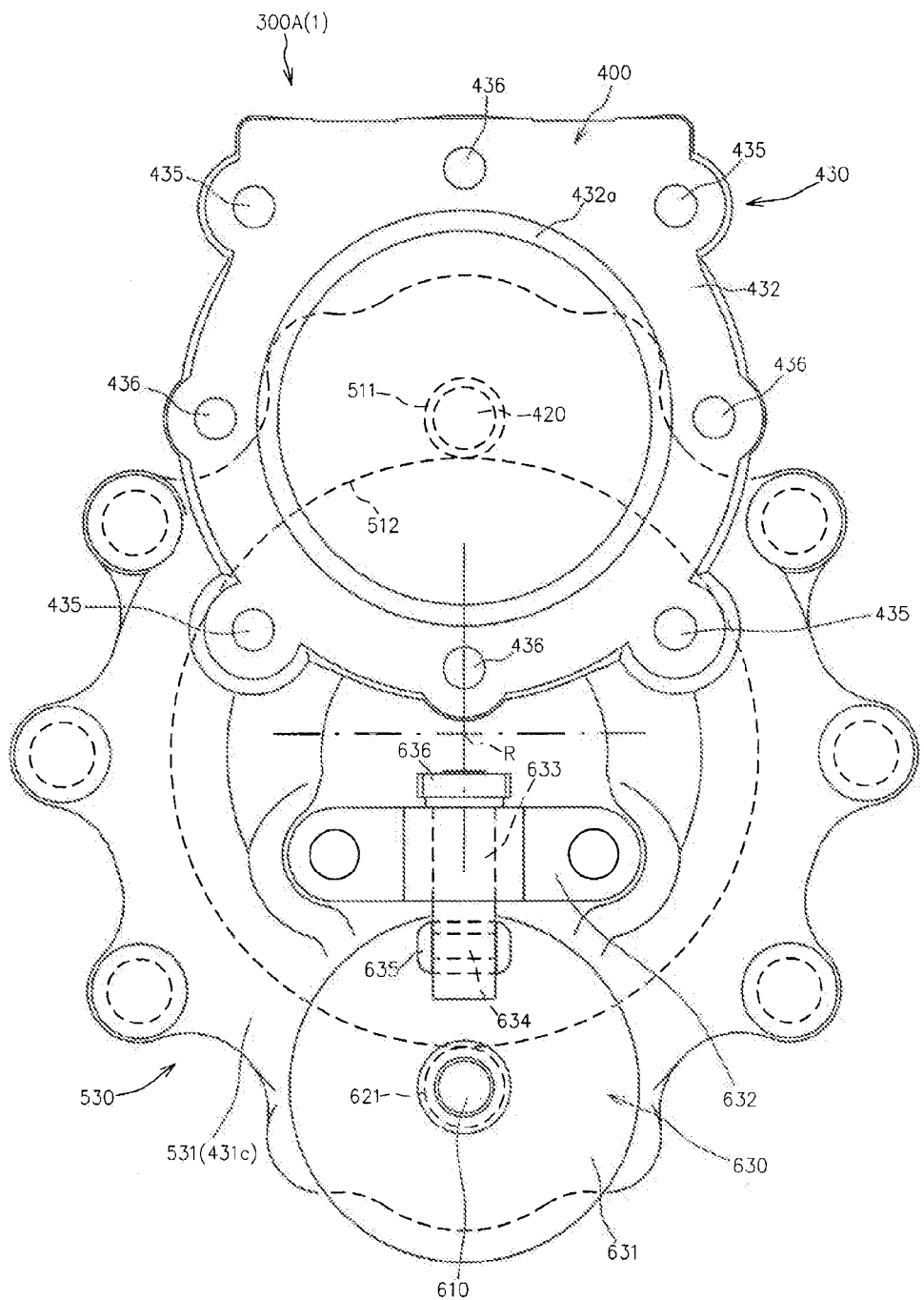
FIG. 5 is an end view of the wheel motor device taken along the line V-V in FIG. 4.

Further, FIG. 5 illustrates an end view of the first wheel motor device 300A(1) taken along the line V-V in FIG. 4.

Further, the wheel motor device 300A(2) (hereinafter, referred to as a second wheel motor device) for driving the other one of the pair of driving wheels 50(1) and 50(2) (hereinafter, referred to as a second driving wheel 50(2)) has the same structure as that of the first wheel motor device 300A(1), and the respective wheel motor devices are symmetrically mounted with respect to the pair of main frames 11.

As illustrated in FIG. 4, the first wheel motor device 300A(1) includes a hydraulic motor unit 400 including the hydraulic motor main body 410 which forms the HST in cooperation with the hydraulic pump main body 110, a speed-reduction gear unit 500 including a speed-reduction gear mechanism 510 for reducing the speed of the rotational power output from the hydraulic motor main body 410, and a first output member 350(1) for outputting, to the first driving wheel 50(1), the rotational power whose speed has been reduced by the speed-reduction gear mechanism 510.

As illustrated in FIG. 4, the hydraulic motor unit 400 includes a motor shaft 420 which supports the hydraulic motor main body 410 in a relatively non-rotatable manner, and a motor case 430 which supports the motor shaft 420 in a rotatable manner about the axis line and also accommodates the hydraulic motor main body 410, in addition to the hydraulic motor main body 410.

The hydraulic motor main body 410 includes a motor-side cylinder block 411 supported by the motor shaft 420 in a relatively non-rotatable manner, and plural motor-side pistons 412 accommodated in the motor-side cylinder block 411 in a relatively non-rotatable manner around the axis line of the motor shaft and in a reciprocating manner along the axis line.

As described above, in the present embodiment, the hydraulic motor main bodies 410 are of a fixed displacement type.

Accordingly, the hydraulic motor unit 400 includes a fixed swash plate 440, in addition to the components.

The motor case 430 is coupled directly or indirectly to one of the pair of main frames 11.

In the present embodiment, as illustrated in FIG. 1 and FIG. 2, the vehicle frame 10 has a pair of mounting frames 15 extending downwards from the pair of main frames 11 such that their plate surfaces are faced to the pair of driving wheels 50(1), 50(2), and the motor case 430 is coupled to the corresponding one of the mounting frames 15.

Preferably, the pair of mounting frames 15 are coupled to each other at their lower end portions through a reinforcing frame 16, as illustrated in FIGS. 1 and 2. This structure can increase the rigidity of the vehicle frame 10.

Further, in the structure where the pair of mounting frames 15 are coupled to each other at their lower end portions through the reinforcing frame 16, the discharge duct 70 is passed through the space defined by the cross member 12, the pair of main frames 11, the pair of mounting frames 15 and the reinforcing frame 16, as illustrated in FIG. 2.

As illustrated in FIG. 3, the motor case 430 is formed with a pair of motor-side hydraulic fluid channels 215 which form portions of the pair of first and second hydraulic fluid lines 200(1) and 200(2).

More specifically, as illustrated in FIG. 4 and FIG. 5, the motor case 430 has a hollow-shaped motor case main body 431 with an opening having a size that allows the hydraulic motor main body 410 to pass therethrough, and a motor-side port block 432 detachably coupled to the motor case main body 431 in such a way as to close the opening in a liquid-tight manner, wherein the pair of motor-side hydraulic fluid channels 215 are formed in the motor-side port block 432.

In FIG. 5, there are shown mounting holes 435 for coupling the motor case 430 to the mounting frame 15, and coupling holes 436 for coupling the motor case main body 431 and the motor-side port block 432 to each other.

The pair of motor-side hydraulic fluid channels 215 include a first motor-side hydraulic fluid channel 215(1) which experiences a higher pressure at a time of the forward movement of the vehicle and a second motor-side hydraulic fluid channel 215(2) which experiences a higher pressure at a time of the rearward movement of the vehicle.

The first motor-side hydraulic fluid channel 215(1) has a first end opened to the outer surface of the motor-side port block to form a first motor-side hydraulic fluid port 216(1) and a second end fluidly connected to the hydraulic motor main body 410 through a first kidney port opened to a contacting surface of the motor-side port block 432 to which the hydraulic motor main body 410 contacts in a rotatable manner.

Similarly, the second motor-side hydraulic fluid channel 215(2) has a first end opened to the outer surface of the motor-side port block 432 to form a second motor-side hydraulic fluid port 216(2) and a second end fluidly connected to the hydraulic motor main body 410 through a second kidney port opened to the contacting surface of the motor-side port block 432 to which the hydraulic motor main body 410 contacts in a rotatable manner.

As described above, in the present embodiment, the hydraulic motor main body 410 in the first motor device 300A(1) and the hydraulic motor main body 410 in the second motor device 300A(2) are fluidly connected to the single hydraulic pump main body 110 in such a manner that they are parallel with respect to the hydraulic pump main body 110.

Namely, as illustrated in FIG. 3, the first motor-side hydraulic fluid ports 216(1) in the first and second wheel motor devices 300(1), 300A(2) are fluidly connected to each other through the first motor-side hydraulic fluid conduit 214(1) and, also, the second motor-side hydraulic fluid ports 216(2) in the first and second wheel motor devices 300(1), 300A(2) are fluidly connected to each other through the second motor-side hydraulic fluid conduit 214(2).

Further, the first and second motor-side conduits 214(1), 214(2) are fluidly connected to the first and second pump-side hydraulic fluid conduits 213(1), 213(2), respectively.

As illustrated in FIG. 4, the motor case main body 431 is placed such that the opening is orientated inwards in the vehicle-widthwise direction.

More specifically, the motor case main body 431 includes a hollow peripheral wall 431a extending in the direction of the rotational axis of the hydraulic motor main body 410 in such a way as to surround the hydraulic motor main body 410, and an end wall 431b which closes the end portion of the peripheral wall 431a on a side closer to the corresponding first driving wheel 50(1), wherein the end portion of the peripheral wall 431a on a side away from the first driving wheel 50(1) forms the opening.

Further, the motor-side port block 432 is detachably coupled to the end portion of the motor case main body 431 on a side away from the first driving wheel 50(1) in such a way as to close the opening.

By making an arrangement that the motor-side port block 432, to which the first and second motor-side hydraulic fluid conduits 214(1), 214(2) are connected, is positioned on a side away from the first driving wheel 50(1) with the motor case main body 431 as a reference, as described above, it is possible to insert the motor case main body 431 and/or a gear case 530 coupled to the motor case main body 431, which will be described later, into the wheel 55 of the corresponding first driving wheel 50(1), as much as possible (see FIG. 4).

Accordingly, it is possible to expand the free space between the first wheel motor device 300A(1) for driving the first driving wheel 50(1) and the second wheel motor device 300A(2) for driving the second driving wheel 50(2), as much as possible.

Preferably, as illustrated in FIG. 4, the motor-side port block 432 may be formed with a cylindrical protrusion 432a at the surface on a side opposite from the side to which the motor case main body 431 is mounted, and the protrusion 432a can be inserted into a circular hole 15a formed in the mounting frame 15 to perform positioning the motor case 430.

The motor shaft 420 is supported in a rotatable manner around the axis line by the motor-side port block 432, the end wall 431b of the motor case main body 431 and a gear case 530 which will be described later, in a state of being substantially parallel to the rotational axis line R of the corresponding first driving wheel 50(1), as illustrated in FIG. 4.

More specifically, as illustrated in FIG. 4, an end portion of the motor shaft 420 which is closer to the corresponding first driving wheel 50(1) is penetrated through the end wall 431b and is extended into a gear space 530S which will be described later, thereby forming an output end portion for outputting rotational power to the speed-reduction gear mechanism 510.

The speed-reduction gear unit 500 includes the gear case 530 which accommodates the speed-reduction gear mechanism 510 and which supports the first output member 350 in a rotatable manner around the axis line, in addition to the speed-reduction gear mechanism 510.

The gear case 530 is coupled to the motor case 430 in such a way as to form a casing of the wheel motor device 300A(1) in cooperation with the motor case 430.

In the present embodiment, the gear case 530 includes an inner-side case body 531 formed integrally with the motor case 430, and an outer-side case body 532 detachably coupled to the inner-side case body 531.

More specifically, as illustrated in FIG. 4, the end wall 431b of the motor case main body 431 has an extended wall 431c extending in the direction orthogonal to the motor shaft 420, and the extended wall 431c forms the inner-side case body 531.

As a matter of cause, the inner-side case body 531 can be formed separately from the motor case main body 431 and can be coupled to the motor case main body 431.

As illustrated in FIG. 4, the outer-side case body 532 is detachably coupled to the side of the inner-side case body 531 which is closer to the first driving wheel, in such a way as to define the gear space 530S for accommodating the speed-reduction gear mechanism 510 between the outer-side case body 532 and the inner-side case body 531.

The speed-reduction gear mechanism 510 is configured so as to reduce the speed of the rotational power from the motor shaft 420 and transmit it to the first output portion 350(1).

In the present embodiment, as illustrated in FIG. 4, the speed-reduction gear mechanism 510 includes a driving-side gear 511 with a smaller diameter which is provided On the output end portion of the motor shaft 420, and an output gear 512 with a larger diameter which is provided on the first output member 350(1) in a state of being engaged with the driving-side gear 511.

In the present embodiment, as illustrated in FIG. 4, the first output member 350(1) is formed to be an output shaft.

More specifically, the first output member 350(1) is supported by the gear case 530 in a rotatable manner around the axis line in a state of being positioned coaxially with the rotational axis line R of the corresponding first driving wheel 50(1), and the end portion of the first output member 350(1) on a side closer to the first driving wheel 50(1) is extended outwards and is coupled to the wheel 55 of the first driving wheel 50(1).

Further, in the present embodiment, the first and second wheel motor devices 300A(1), 300A(2) are mounted to the working vehicle in such a manner that they drive the non-steering wheels (the rear wheels in the illustrated embodiment), but the present invention is not limited to this embodiment, as a matter of cause.

For example, there may be provided steering frames (not illustrated) which are respectively coupled to the left and right sides of the vehicle frame 10 through kingpins such that they can be steered and, also, the first and second wheel motor devices 300A(1), 300A(2) may be mounted to the left and right steering frames for driving the steering wheels. With this structure, the first and second wheel motor devices 300A(1), 300A(2) at the left and right sides are steered in synchronization with each other through a tie rod mounted to the gear cases 530 or the steering frames in the wheel motor devices 300A(1), 300A(2).

Further, while, in the present embodiment, the hydraulic motor main bodes 410 in the first and second wheel motor devices 300A(1), 300A(2) are fluidly connected in parallel with respect to the single hydraulic pump main body 10 as described above, instead of this structure, the working vehicle may be provided with a pair of hydraulic pump main bodies 110 and, also, the hydraulic motor main bodies 410 in the first and second wheel motor devices 300A(1) and 300A(2) may be individually and fluidly connected to the pair of hydraulic pump main bodies 110.

As illustrated in FIG. 3 to FIG. 5, the wheel motor device 300A(1) includes a brake mechanism 600 for operatively and selectively applying a braking force to the first output member 350(1), in addition to the components.

As illustrated in FIG. 4 and the like, the brake mechanism 600 includes a brake shaft 610 supported by the casing, a speed-increasing gear mechanism 620 for increasing the rotational power from the first output member 350(1) and operatively transmitting it to the brake shaft 600, and a brake unit 630 for selectively applying a braking force to the brake shaft 610.

The wheel motor device 300A(1) with the braking mechanism 600 can offer the following effects.

Namely, the brake mechanism 600 is configured so as to apply the braking force to the brake shaft 610 which has a rotational speed increased by the speed-increasing gear mechanism 620 so as to be higher than that of the first output member 350(1).

Accordingly, it is possible to reduce the brake capacity required for the brake mechanism 600, thereby enabling reduction of the size of the brake mechanism 600.

Further, the brake shaft 610 to which the braking force is operatively applied is independent of the transmission path for transmitting the rotational power from the motor shaft 420 to the first output member 350(1) through the speed-reduction gear mechanism 510. The configuration allows the brake shaft 610 to be placed at an arbitrary position, independently of the positions at which the motor shaft 420, the speed-reduction gear mechanism 510 and the first output member 350(1) are installed, thereby increasing the degree of freedom in designing the brake mechanism 60.

As illustrated in FIG. 4, the brake shaft 610 is provided with a driven-side gear 621 with a smaller diameter which engages with the output gear 512.

In this structure, the output gear 512 and the driven-side gear 621 form the speed-increasing gear mechanism 620.

In the present embodiment, as illustrated in FIG. 4 and FIG. 5, the brake shaft 610 is supported by the gear case 530 in a rotatable manner around the axis line, in a state where its end portion on a side away from the first driving wheel 50(1) is extended outwards and where it is substantially parallel to the rotational axis line R of the first driving wheel 50(1), at a position displaced from the motor shaft 420 about the rotational axis line R of the first driving wheel 50(1).

Further, the brake unit 630 has a brake disk 631 supported by the outwardly-extending end portion of the brake shaft 610 in a relatively non-rotatable manner, and is configured so as to selectively apply the braking force to the brake disk 631 on the basis of an operation from the outside.

With this structure, it is possible to effectively prevent the free space between the pair of driving wheels 50(1), 50(2) from being reduced due to the provision of the brake mechanism 600.

Namely, as illustrated in FIG. 4, with the above-described structure, it is possible to position the brake unit 630 at the same position as the hydraulic motor main body 410 with respect to the rotational axis line R of the first driving wheel 50(1) (in the vehicle-widthwise direction).

Accordingly, it is possible to prevent the wheel motor device 300A(1) from being expanded in the direction of the rotational axis line R of the first driving wheel 50(1) due to the provision of the brake mechanism 600, thereby ensuring the free space between the pair of driving wheels 50(1), 50(2) as much as possible.

As illustrated in FIGS. 4 and 5, the brake unit 630 includes a mounting stay 632 detachably supported on the end surface of the gear case 530 on a side opposite from the first driving wheel 50(1) (the outer surface of the inner-side case body 531, in the present embodiment), a brake operation shaft 633 supported by the mounting stay 632 in a rotatable manner around the axis line in a state of being substantially parallel to the disk surface of the brake disk 631, and a push-side brake pad 634 supported by the brake operation shaft 633 in such a way as to contact with or separate from the brake disk 631 in accordance with the rotation of the brake operation shaft 633 about the axis line, in addition to the brake disk 631.

More specifically, as illustrated in FIG. 4, the brake operation shaft 633 has a first end portion 633a having a non-circular cross-sectional shape, wherein the push-side brake pad 634 is supported by the first end portion 633a.

As illustrated in FIGS. 4 and 5, the brake operation shaft 633 is supported by the mounting stay 632 such that the first end portion 633a overlaps with the brake disk 631 as viewed along the rotational axis line of the brake disk 631.

The brake operation shaft 633 is operatively connected to a brake operation member (not illustrated) provided near the driving seat 20, through, for example, a link mechanism including a connecting arm 636 coupled to the brake operation shaft 633 in a relatively non-rotatable manner around the axis line of the brake operation shaft 633 (see FIGS. 4 and 5).

In the present embodiment, the first end portion 633a of the brake operation shaft 633 is formed with a concave portion at the outer surface which is faced to the brake disk 631, and the push-side brake pad 634 is placed within the concave portion.

In the present embodiment, the brake disk 631 is supported by the brake shaft 610 in a movable manner along the axis line, in a state of being rotated along with the brake shaft 610 around the axis line.

In order to effectively making it possible to apply a braking force to the brake disk 631 having the above-described structure, the brake unit 600 includes a fixed-side brake pad 635 detachably supported by the gear case 530, such that the fixed-side brake pad 635 is faced to the push-side brake pad 634 across the brake disk 631, as illustrated in FIG. 4.

While, in the present embodiment, the disk-brake type mechanism having the above-described structure is employed as the brake mechanism 60, instead of this mechanism, it is also possible to employ an internal-expanding drum brake type mechanism or a band-brake type mechanism.

Figure 6:
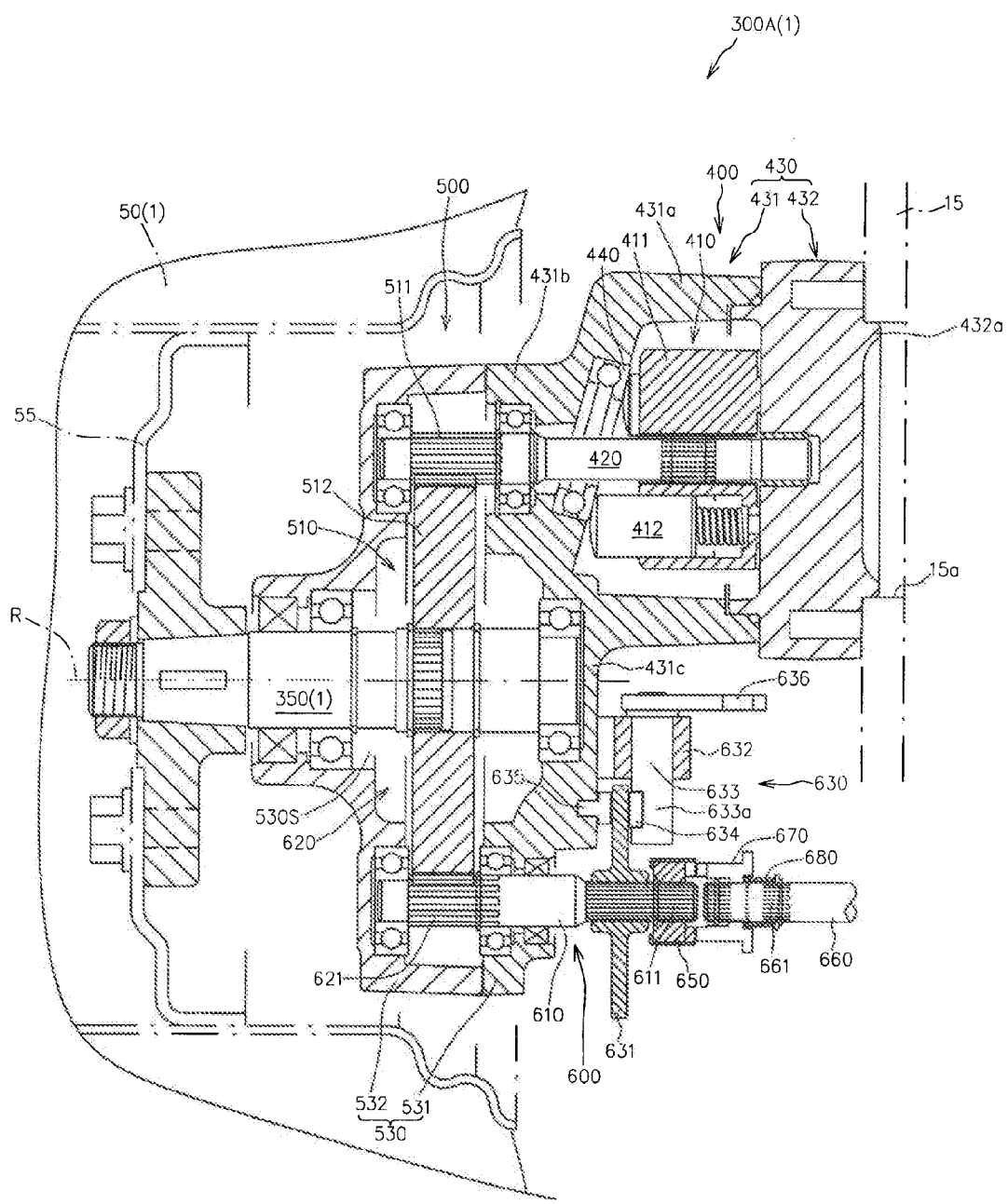
FIG. 6 is a vertical cross-sectional front view of the wheel motor device, showing a state in which pair of driving wheels of the working vehicle are driven at a differential-lock state.

Preferably, as illustrated in FIG. 6, the brake shaft 610 which constantly rotates in synchronization with the motor shaft 420 can have splines 611 at a portion away from the corresponding first driving wheel 50(1) than the brake disk 631.

With this structure, it is possible to easily connect the brake shaft 610 in the first wheel motor device 300A(1) for driving the first driving wheel 50(1) and the brake shaft 610 in the second wheel motor device 300A(2) for driving the second driving wheel 50(2) to each other in a relatively non-rotatable manner around their axis lines, thereby making it possible to drive the first and second driving wheels 50(1), 50(2) in a differential-lock state.

Namely, as described above, in the present embodiment, the hydraulic motor main bodies 410 in the first and second wheel motor devices 300A(1) and 300A(2) are fluidly connected in parallel with respect to the hydraulic pump main body 110, and the first and second driving wheels 50(1), 50(2) are therefore differentially driven by using hydraulic effect.

With this structure, in the event that one of the first and second driving wheels 50(1) and 50(2) falls in a concave portion, a mud area and the like so that the rotational load on this driving wheel is extremely reduced, the hydraulic fluid from the hydraulic pump main body 110 is intensively flowed into the hydraulic motor main body 410 in the wheel motor device 300A(1) or 300A(2) for operatively driving this driving wheel. As a result, the hydraulic fluid is not supplied to the hydraulic motor main body 410 in the wheel motor device 300A(1) or 300A(2) for operatively driving the other one of the driving wheels 50(1) and 50(2), which may make it impossible to move the working vehicle.

In order to avoid the occurrence of the such a state, in the present embodiment, the brake shaft 610 in the first wheel motor device 300A(1) and the brake shaft 610 in the second wheel motor device 300A(2) could be coupled to each other using the splines 611 such that they are relatively non-rotatable to each other about their axis lines.

More specifically, as illustrated in FIG. 6, the brake shaft 610 is provided with a brake-shaft-side coupling 650 which is relatively non-rotatable about the axis line with respect to the brake shaft 610 through the splines 611. The brake-shaft-side coupling 650 has a concave/convex engagement portion at an end surface on a side opposite from the corresponding first driving wheel 50(1), the concave/convex portion being opened toward the other driving wheel or the second driving wheel 50(2).

Meanwhile, the working vehicle 1A to which the wheel motor devices 300A(1), 300A(2) are applied is provided with a differential-lock connecting shaft 660.

The differential-lock connecting shaft 660 is provided in the working vehicle 1A, such that it can be selectively positioned at a differential-lock position that is coaxial with the brake shaft 610 (see FIG. 6) and at a differential position that is displaced from the brake shaft 610 (not illustrated).

The differential-lock connecting shaft 660 is formed with splines 661 at the opposite ends and is provided with first and second coupling-shaft-side couplings 670 at one end and the other end in a relatively non-rotatable manner about the axis line through the splines 661.

Each of the first and second coupling-shaft-side couplings 670 has a concave/convex engagement portion opened toward the corresponding driving wheel.

The switching between the differential state and the differential-lock state is performed as follows.

The differential-lock connecting shaft 660 is positioned at the differential position, at an initial state.

At this state, there is realized a differential state where the first and second driving wheels 50(1), 50(2) are differentially driven using hydraulic effect.

On the other hand, in a case where it is necessary to perform the transition from the differential state to the differential-lock state, an operator moves the differential-lock connecting shaft 660 from the differential position to the differential-lock position illustrated in FIG. 6 and, at this state, the first and second coupling-shaft-side couplings 670 are engaged with the brake-shaft-side couplings 650 in the first and second wheel motor devices 300A(1), 300A(2) in a concave-to-convex manner.

Accordingly, the first output members 350(1) in the first and second wheel motor devices 300A(1) are forcibly and mechanically coupled to each other, thereby realizing the differential-lock state where the first and second driving wheels 50(1), 50(2) are forcibly driven at the same speed.

Preferably, as illustrated in FIG. 6, the differential-lock connecting shaft 660 may be provided with a biasing member 680 for biasing at least one of the first and second coupling-shaft-side couplings 670 to the corresponding brake-shaft-side coupling 650.

With this structure, it is possible to enhance the efficiency of the operation for switching between the differential state and the differential-lock state.

In the wheel motor device 300A(1) according to the present embodiment, there is only a single position at which the brake shaft 610 can be installed (see FIG. 5).

Namely, in the present embodiment, the brake shaft 610 can be supported at a single position which is just opposite from the motor shaft 420 with the rotational axis line of the first output member 350(1) as a reference (namely, which is displaced by about 180 degree from the motor shaft 420 about the rotational axis line of the first output member 350(1)). However, instead of this structure, the brake shaft 610 may be supported at plural positions about the rotational axis line of the first output member 350(1).

Figure 7:
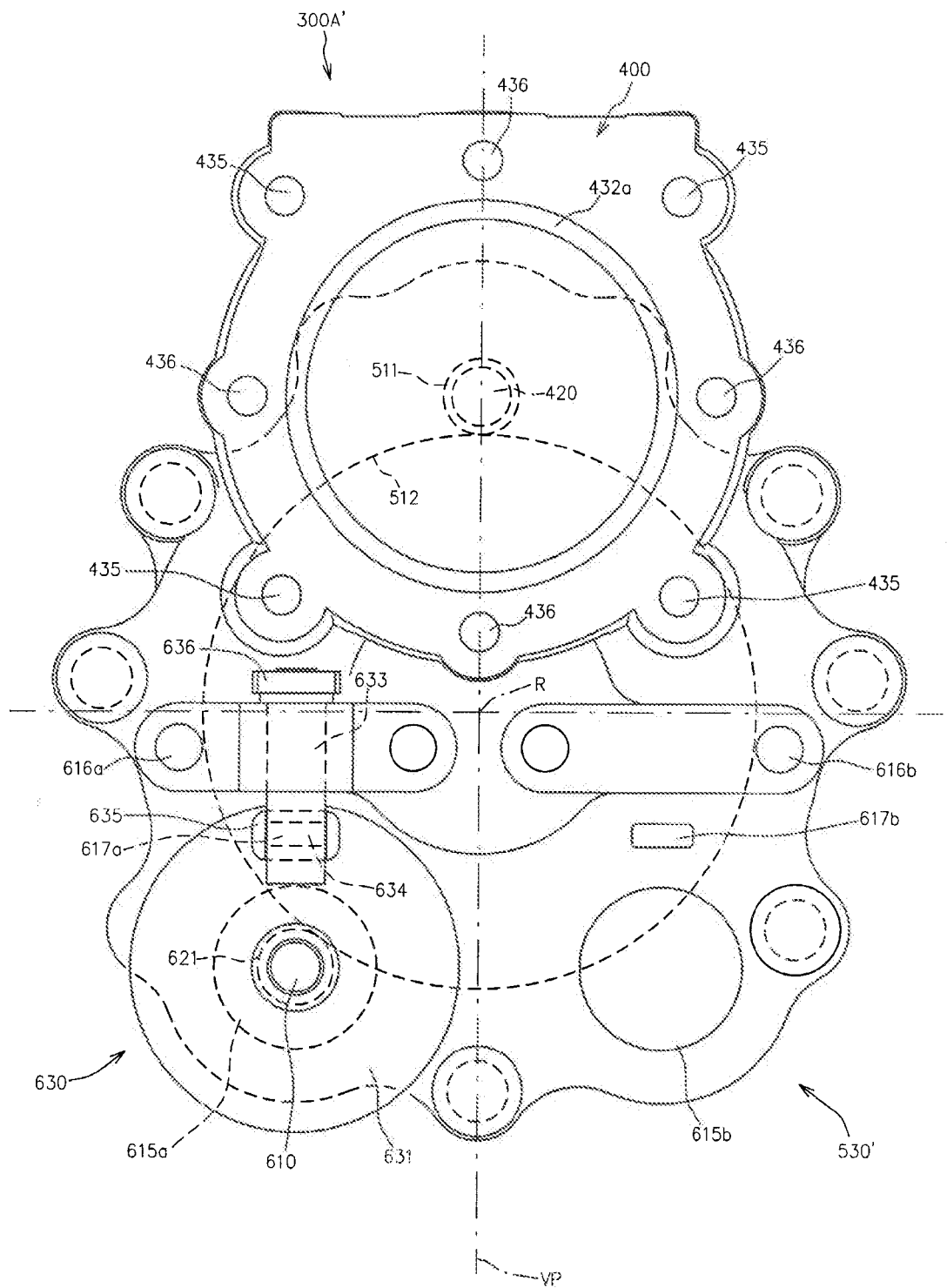
FIG. 7 is an end view of a wheel motor device according to a modified embodiment of the first embodiment.

FIG. 7 illustrates an end view of a wheel motor device 300A' according to a modified embodiment of the present embodiment, corresponding to FIG. 5.

As illustrated in FIG. 7, the wheel motor device 300A' according to the modified embodiment includes a gear case 530', instead of the gear case 530.

The gear case 530' has plural brake-shaft bearing portions 615a, 615b capable of supporting the brake shaft 610 at plural positions about the rotational axis line of the first output member 350(1) which is positioned coaxially with the rotational axis line R of the corresponding driving wheel.

The gear case 530' is also configured so as to be capable of supporting the mounting stay 632 and the fixed-side brake pad 635, at plural positions corresponding to the plural brake-shaft bearing portions 615a, 615b.

Namely, as illustrated in FIG. 7, the gear case 530' includes the plural brake-shaft bearing portions 615a, 615b positioned around the rotational axis line of the first output member 350(1), and plural mounting stay mounting portions 616a, 616b and plural fixed-side brake-pad mounting portions 617a, 617b corresponding to the plural brake-shaft bearing portions 615a, 615b.

By employing the configuration where the brake shaft 610 can be installed at the plural positions about the axis line of the first output member 350(1) as described above, it is possible to enhance the degree of freedom in designing the position at which the brake mechanism 600 is installed.

Preferably, the plural brake-shaft bearing portions 615a, 615b capable of supporting the brake shaft 610 include first and second bearing portions 615a, 615b which are symmetrical to each other with an imaginary vertical plane VP as a reference, which passes through the rotation axis line of the first output member 350(1).

With this structure, in the case where the pair of wheel motor devices 300A' are employed as a first wheel motor device 300A'(1) for driving the first driving wheel 50(1) and a wheel motor device 300A'(2) for driving the second driving wheel 50(2), it is possible to have the brake shafts 610 in the first and second wheel motor devices 300A'(1), 300A'(2) positioned coaxially to each other.

Namely, by arranging the brake shaft 610 in the first wheel motor device 300A' (1) at one of the first and second bearing portions 615a, 615b while arranging the brake shaft 610 in the second wheel motor device 300A'(2) at the other one of the first and second bearing portions 615a, 615b, it is possible to have the brake shafts 610 in the first and second wheel motor devices 300A'(1), 300A'(2) positioned coaxially to each other, while employing wheel motor devices with the same structure as the first and second wheel motor devices 300A'(1), 300A'(2).

Further, in the working vehicle 1A where the pair of rear wheels are formed to be the pair of driving wheels 50(1), 50(2) as in the present embodiment, the brake shafts 610 preferably may be supported by bearing portions positioned in the front side of the vehicle than the rotational axis line of the corresponding driving wheels 50(1), 50(2), at a state where the wheel motor devices 300A' are mounted in the working vehicle 1A.

With this structure, it is possible to effectively prevent the brake unit 630 from coming into contact with external obstructions during the rearward movement of the vehicle.

Second Embodiment

Hereinafter, another embodiment of the wheel motor device according to the present invention will be described, with reference to the attached drawings.

Figure 8:
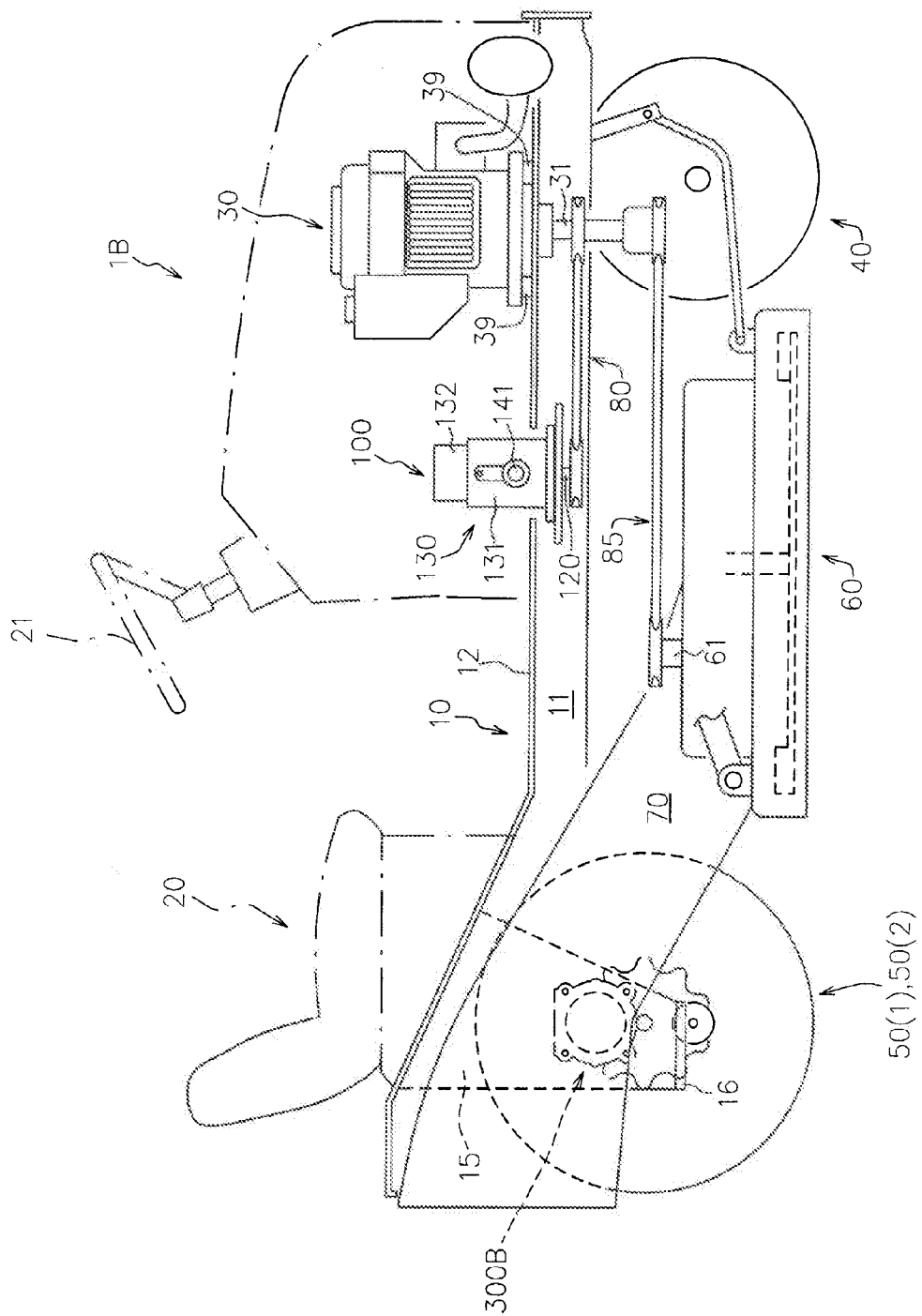
FIG. 8 is a schematic side view of a working vehicle to which a wheel motor device according to a second embodiment of the present invention is applied.
Figure 9:
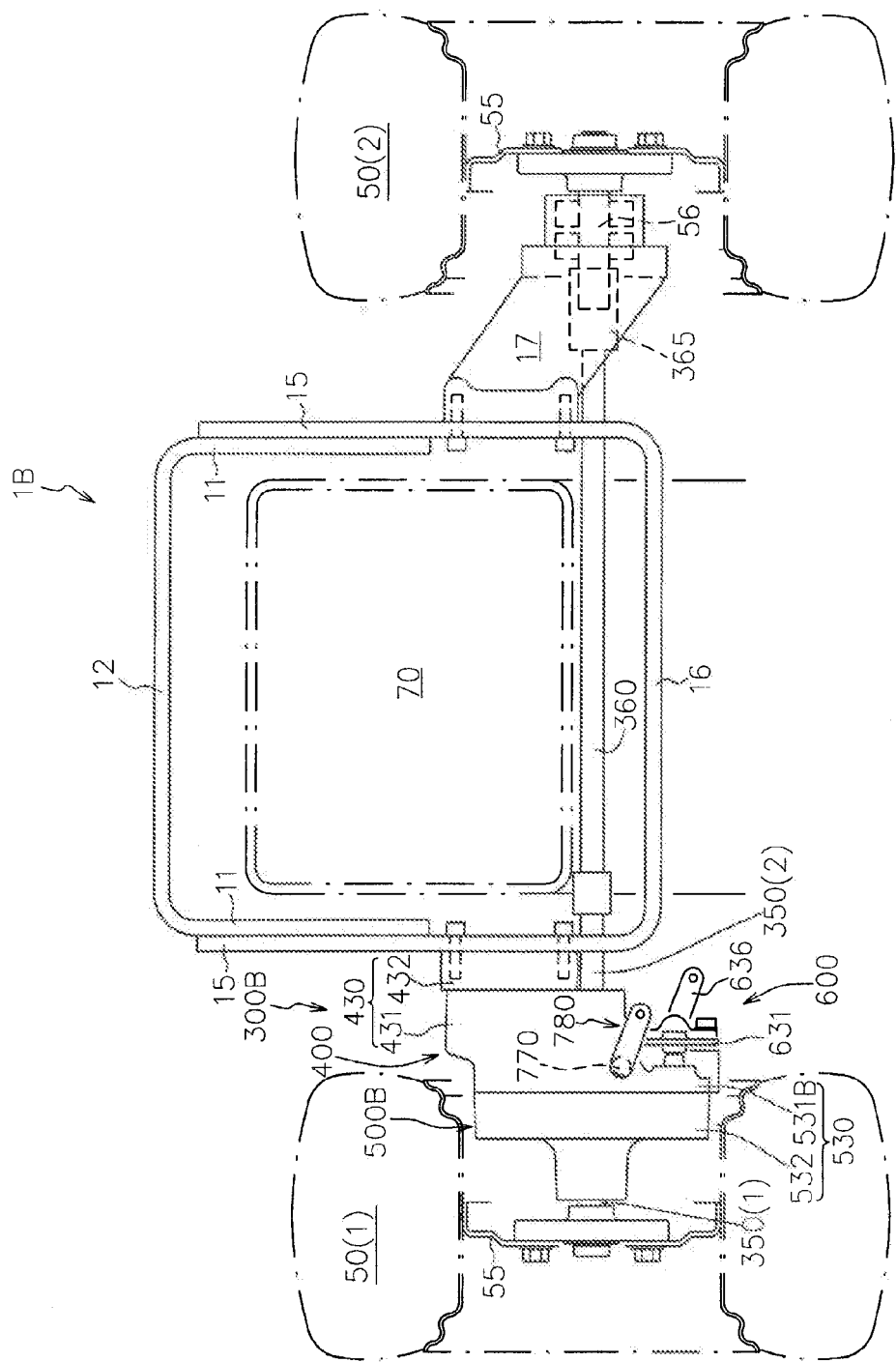
FIG. 9 is a schematic rear view of the working vehicle shown in FIG. 8.

FIGS. 8 and 9 illustrate a schematic side view and a schematic rear view of a working vehicle 1B to which the wheel motor device 300B according to the present embodiment is applied.

In the figures, the components same as those in the first embodiment are designated by the same reference characters and detailed description thereof will not be repeated.

While the wheel motor device 300A according to the first embodiment is configured so as to output the driving power only to the corresponding one of the driving wheels (for example, the first driving wheel 50(1)), the wheel motor device 300B according to the present embodiment is configured so as to output the driving power to the corresponding one of the driving wheels (for example, the first driving wheel 50(1)) and also output the driving power to the other driving wheel (for example, the second driving wheel 50(2)).

Figure 10:
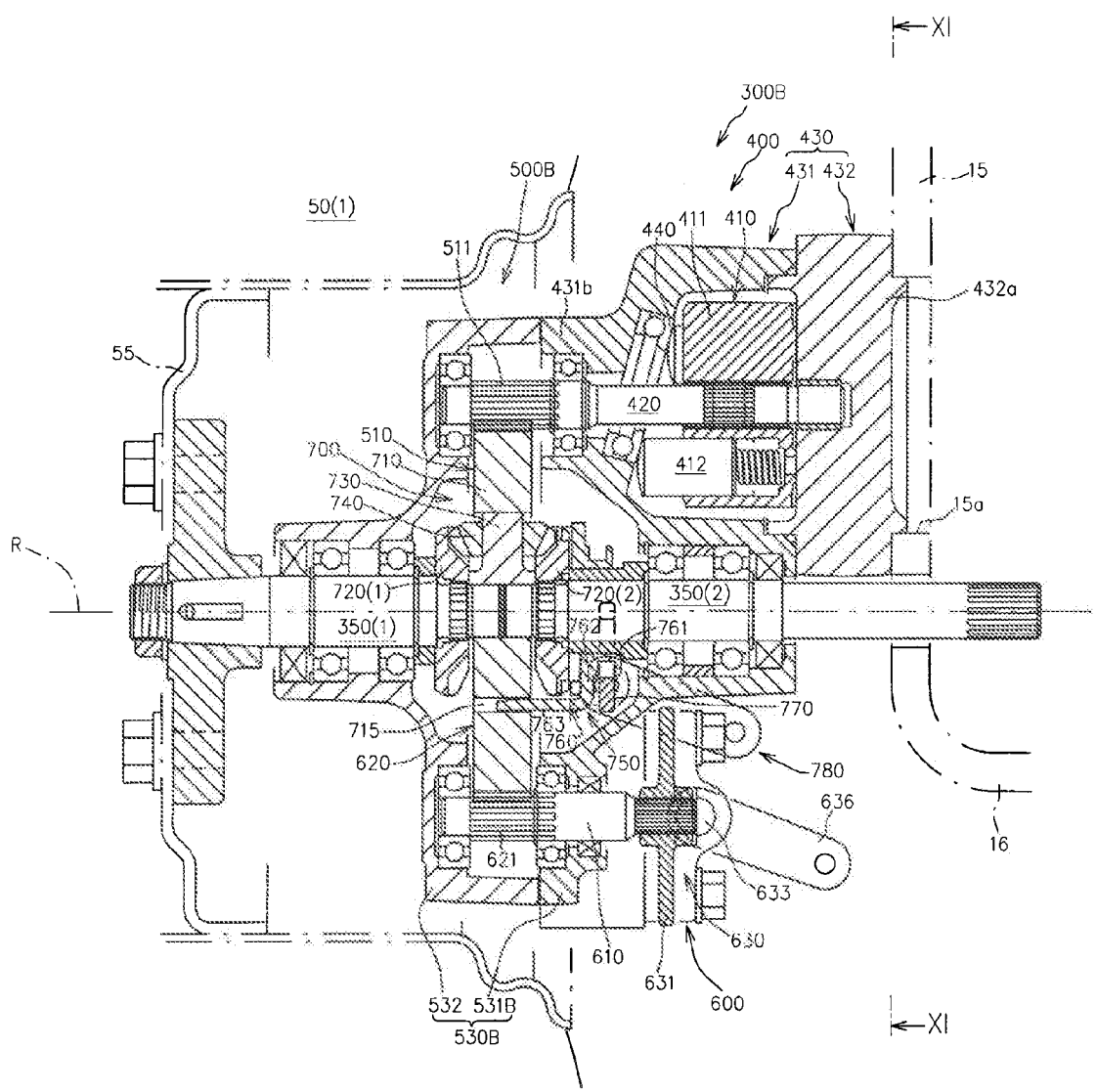
FIG. 10 is a vertical cross-sectional front view of the wheel motor device according to the second embodiment.
Figure 11:
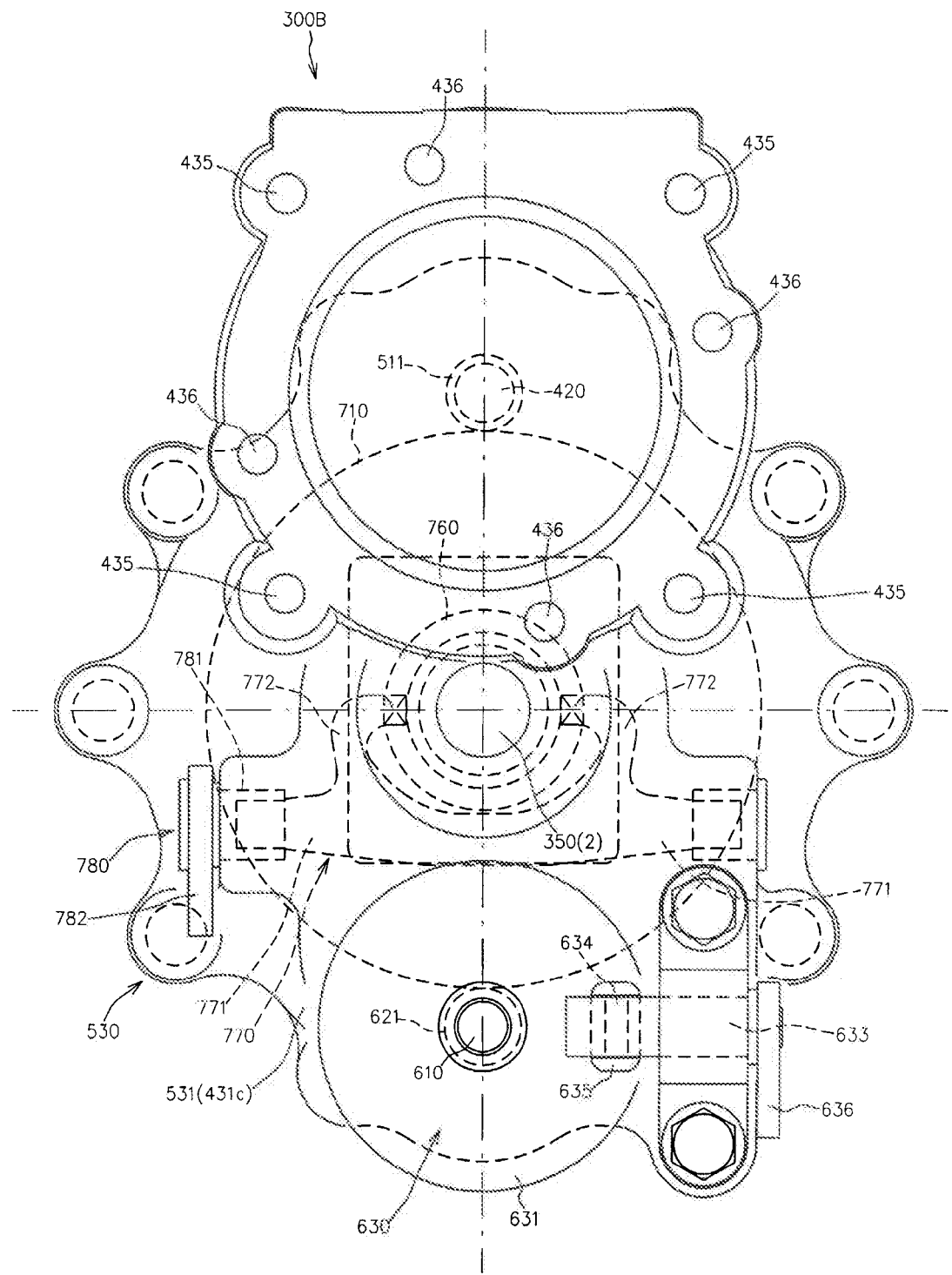
FIG. 11 is an end view of the wheel motor device taken along the line XI-XI in FIG. 10.

FIGS. 10 and 11 illustrate a vertical cross-sectional view of the wheel motor device 300B and an end view of the same taken along the line XI-XI in FIG. 10, respectively.

As illustrated in FIGS. 10 and 11, the wheel motor device 300B includes a speed-reduction gear unit 500B, instead of the speed-reduction gear unit 500 in the wheel motor devices 300A according to the first embodiment, and also includes a second output member 350(2) for outputting the rotational power to the other driving wheel (for example, the driving wheel 50(2)) on a side opposite from the corresponding one driving wheel (for example, the driving wheel 50(1)) which is close to the wheel motor device 300B.

Namely, the wheel motor device 300B includes the hydraulic motor unit 400, the speed-reduction gear unit 500B, the first output member 350(1), the second output member 350(2) and the brake mechanism 600.

As illustrated in FIG. 10, the speed-reduction gear unit 500B includes a gear case 530B for supporting the first and second output members 350(1), 350(2) in a rotatable manner around their axis lines, and a mechanical differential gear mechanism 70 accommodated within the gear case 530B.

The gear case 530B is coupled to the motor case 430 in such a way as to form a casing of the wheel motor device 300B in cooperation with the motor case 430, similarly to the gear case 530 according to the first embodiment.

The gear case 530B includes an inner-side case body 531B formed integrally with the motor case 430, and the outer-side case body 532 detachably coupled to the inner-side case body 531B.

In the present embodiment, as in the first embodiment, the extended wall 431c of the motor case main body 431 forms the inner-side case body 531B. As a matter of cause, the inner-side case body 531B can be formed separately from the motor case main body 431.

The gear case 530B supports the first and second output members 350(1), 350(2) in such a manner that they are positioned coaxially to each other and are rotatable around their axis lines independently to each other.

Specifically, the first output member 350(1) is supported by the outer-side case body 532 in a rotatable manner around the axis line so as to be positioned coaxially with the rotational axis line R of the corresponding first driving wheel 50(1) in a state. Where its inner end is positioned within the gear case 530B and its outer end is extended outwards to be close to the first driving wheel 50(1).

Meanwhile, the second output member 350(2) is supported by the inner-side case body 531B in a rotatable manner around the axis line so as to be positioned coaxially with the rotational axis line of the first output member 350(1) in a state where its inner end is positioned within the gear case 530B so as to face to the inner end of the first output member 350(1) and its outer end is extended outwards to be close to the second driving wheel 50(2).

As illustrated in FIG. 9, the second output member 350(2) is coupled to a wheel 55 of the second driving wheel 50(2) through a connecting shaft 360 such that the second output member 350(2) rotate along with the wheel 55 around the axis line.

Further, the connecting shaft 360 can be either formed integrally with the second output shaft 350(2) or formed separately therefrom, as a matter of cause.

In the present embodiment, as illustrated in FIG. 9, the connecting shaft 360 is coupled to a driving axle 56 of the wheel 55 of the second driving wheel 50(2) through a coupling member 365.

The driving axle 56 of the second driving wheel 50(2) is supported in a rotatable manner about the axis line through a bearing bracket 365 coupled to the mounting frames 15, as illustrated in FIG. 9.

The differential gear mechanism 70 includes a ring gear 710 placed coaxially with the rotational axis line of the first and second output members 350(1), 350(2), first and second side bevel gears 720(1), 720(2) respectively supported on the first and second output members 350(1), 350(2) in a relatively non-rotatable manner, a pinion shaft 730 which extends in the direction orthogonal to the rotational axis line of the first and second output members 350(1), 350(2) and which rotates about the rotational axis line of the first and second output members 350(1), 350(2) together with the ring gear 710, and a bevel pinion 740 supported on the pinion shaft 730 in a relatively non-rotatable manner in a state of being engaged with the first and second side bevel gears 720(1), 720(2), as illustrated in FIG. 10.

As illustrated in FIG. 10, the ring gear 710 is engaged with both the driving-side gear 511 provided on the motor shaft 420 and the driven-side gear 621 provided on the brake shaft 610.

Namely, in the present embodiment, the driving-side gear 511 and the ring gear 710 form the speed-reduction gear mechanism 510 and, also, the ring gear 710 and the driven-side gear 621 form the speed-increasing gear mechanism 620.

In the present embodiment, it is possible to obtain an effect of differentially driving the first and second driving wheels 50(1), 50(2) only by providing one wheel motor device 300B in a vicinity of one of the first and second driving wheels 50(1), 50(2), in addition to offering the effects of the first embodiment.

Preferably, the differential gear mechanism 700 includes a differential-lock mechanism 750.

In the present embodiment, as illustrated in FIG. 10 and FIG. 11, the differential-lock mechanism 750 includes a differential-lock slider 760 which is rotatable about the rotational axis line of the first and second output members 350(1), 350(2) together with the ring gear 710 and which is movable in the direction of the rotational axis line, and a differential-lock fork 770 which is supported by the casing in such a way as to move the slider member 760 in the direction of the rotational axis line according to an operation from the outside.

As illustrated in FIG. 10, the differential-lock slider 760 is supported by one (the second output member 350(2) in the illustrated embodiment) of the first and second output members 350(1), 350(2) on which one (the second side bevel gear 720(2) in the illustrated embodiment) of the first and second side bevel gears 750(1), 750(2) is supported, in such a manner that the slider 760 is relatively rotatable around and movable along the axis line of the one output member.

More specifically, the differential-lock slider 760 has a supported portion 761 supported by the corresponding output member, a radially-extended portion 762 extending outwards in the radial direction from the supported portion 761 so as to face to the one of the side bevel gears, and an axially-extended portion 763 extending in the direction of the rotational axis line from the radially-extended portion 762 toward the ring gear 710.

The radially-extended portion 762 is selectively coupled to the one of the side bevel gears in such a manner that it is rotated together with the one side bevel gear, according to the position of the differential-lock slider 760 with respect to the direction along the rotational axis line.

More specifically, the radially-extended portion 762 has one of a concave portion and a convex portion at the surface facing to the one side bevel gear, and the one side bevel gear has the other one of the concave portion and the convex portion at the surface facing to the radially-extended portion 762, so that the concave portion and the convex portion are selectively engaged with each other or disengaged from each other according to the position of the differential-lock slider 760 with respect to the direction of the rotational axis line.

As illustrated in FIG. 10, the axially-extended portion 763 is engaged into a slit 715 formed in the ring gear 710, so that the differential-lock slider 760 rotates together with the ring gear 710 about the rotational axis line of the first and second output members 350(1), 350(2).

The differential-lock fork 770 is configured so as to move the differential-lock slider 760 in the direction along the rotational axis line on the basis of an operation from the outside.

More specifically, the differential-lock fork 770 has rotational shaft portions 771 which are along the direction orthogonal to the rotational axis line and which are supported directly or indirectly by the casing in a rotatable manner around the axis line, and an engagement portion 772 extending from the rotational shaft portions 771 such that its free end portion engages with the differential-lock slider 760.

In the present embodiment, the differential-lock fork 770 has a pair of rotational shaft portions 771 facing to each other across the differential-lock slider 760.

Further, a differential-lock arm 780 is coupled to one of the pair of rotational shaft portions 771 in a relatively non-rotatable manner.

Namely, the differential-lock arm 780 has a supporting shaft portion 781 supported by the casing in a rotatable manner around the axis line, and an arm portion 782 coupled to the supporting shaft portion 781 in such a manner it is positioned outside of the casing with being relatively non-rotatable with respect to the supporting shaft portion 781.

With this structure, one of the pair of rotational shaft portions 771 is coupled to the supporting shaft portion 781 in a relatively non-rotatable manner about the axis line.

The arm portion 782 is operatively connected through a suitable link mechanism (not illustrated) to a differential-lock operation member (not illustrated) capable of being manually operated which is positioned near the driver's seat 20.

The provision of the differential-lock mechanism 750 makes it possible to easily switch between the differential state where the first and second driving wheels 50(1), 50(2) are differentially driven and a differential-lock state where the first and second driving wheels 50(1), 50(2) are forcibly driven at the same speed.

Further, while, in the present embodiment, the single wheel motor device 300A is provided with the differential gear mechanism 700 so that the rotational power from the motor shaft 420 is differentially transmitted to the first and second output members 350(1), 350(2), it is also possible to employ a side clutch or a side brake which is linked to a steering wheel, or a gear-less differential mechanism including two bidirectional clutches, instead of the differential gear mechanism 70.

While, in the first and second embodiments, the motor case 400 is coupled to the mounting frames 15 at the side surface opposite from the corresponding driving wheel for mounting the wheel motor device to the pair of main frames 11 as described above (see FIGS. 4, 10 and the like), the present invention is not limited to the embodiments, as a matter of cause.

Figure 12:
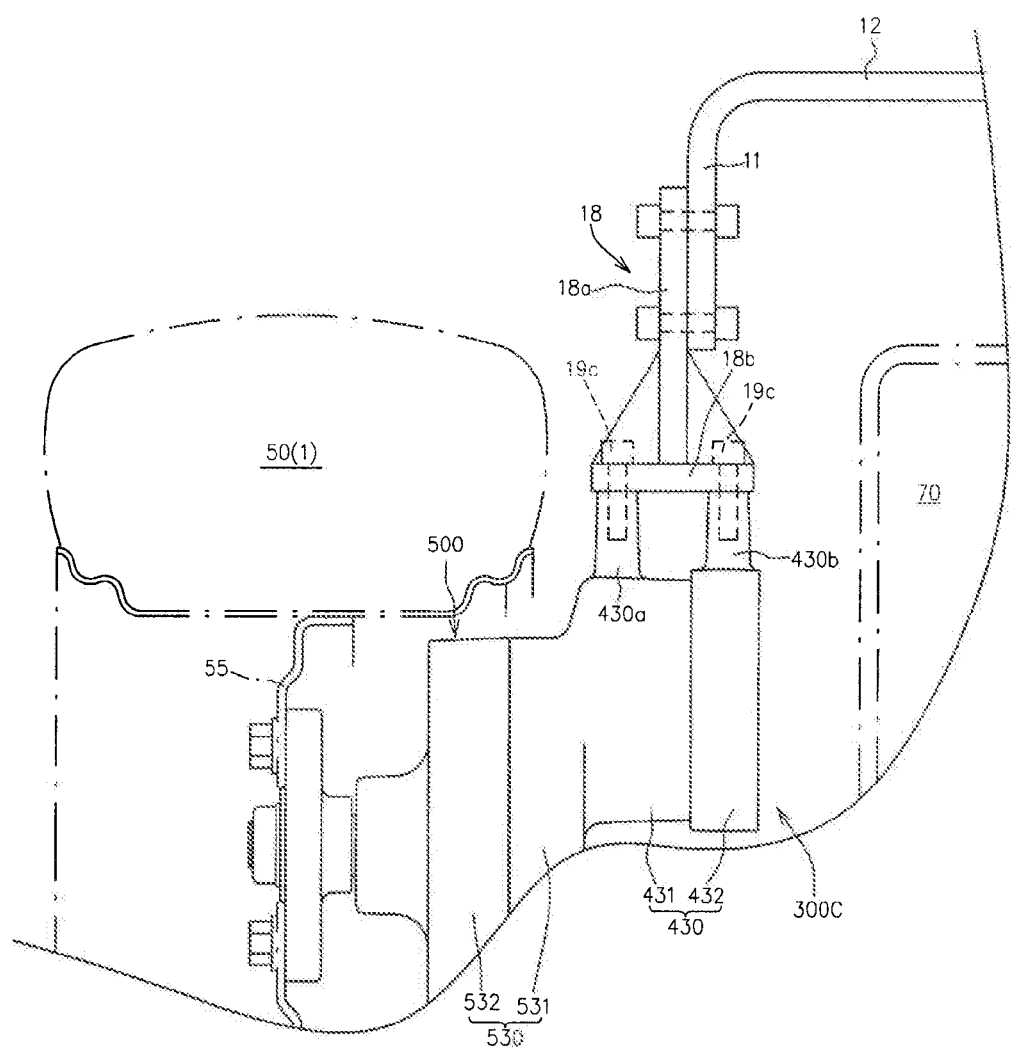
FIG. 12 is a vertical cross-sectional front view a wheel motor device according to a modified embodiment of the present invention.
Figure 13:
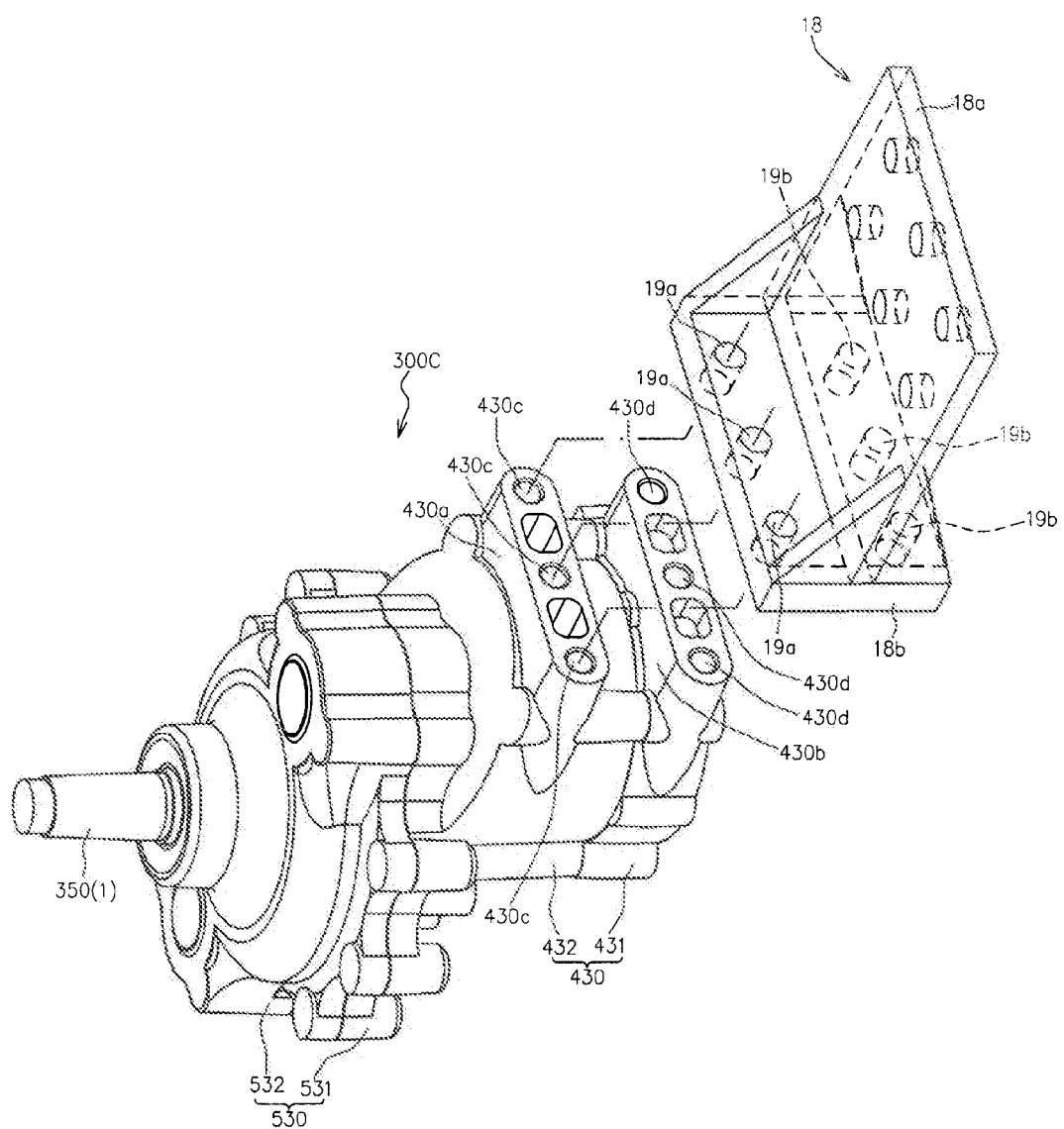
FIG. 13 is an exploded perspective view of the wheel motor device shown in FIG. 12.

FIGS. 12 and 13, respectively, illustrate a vertical cross-sectional view and an exploded perspective view of a wheel motor device 300C mounted to the pair of main frames 11 through another mounting structure, according to a modified embodiment of the present invention.

In FIG. 12 and FIG. 13, the components same as those of the first and second embodiments are designated by the same reference characters and description thereof will not be repeated.

As illustrated in FIGS. 12 and 13, in the wheel motor device 300C, the motor case main body 431 and the motor-side port block 432 have a first and second frame mount bosses 430a and 430b, respectively, on their upper surfaces. In the first and second frame mount bosses 430a and 430b, plural first and second bolt holes 430c and 430d opened upwards are arranged in the lengthwise direction of the vehicle.

Meanwhile, a mounting stay 18 is coupled to an outer side surface of the corresponding main frame 11.

The mounting stay 18 has a substantially T-shape in a cross-section including a vertical portion 18a coupled to the outer side surface of the corresponding main frame 11 through fastening members such as bolts and a horizontal portion 18b coupled to the lower end portion of the vertical portion 18a. The horizontal portion 18b has such a length in the vehicle widthwise direction as to straddle both the bosses 430a and 430b.

The horizontal portion 18b is provided with first and second through holes 19a and 19b corresponding to the first and second bolt holes 430c and 430d, and the mounting stay 18 supports the motor case 430 through plural bolts 19c inserted through the first and second through holes 19a and 19b and also threadedly inserted in the first and second bolt holes 430c and 430d.

As described above, in the wheel motor device 300C, the first and second bosses 430a, 430b are provided on the motor case main body 431 and the motor-side port block 432, which enables effectively accepting bending stresses applied to the wheel motor device 300C.

Namely, both the first and second bosses 430a and 430b can be provided on the upper surface of the motor case main body 431 but this structure will reduce the interval between the first and second bosses 430a and 430b, thereby causing larger loads to be applied to the first and second bosses 430a and 430b.

On the contrary, the structure illustrated in FIG. 12 and FIG. 13 can increase the interval between the first and second bosses 430a and 430b, thereby enabling effectively accepting bending stresses applied to the wheel motor device 300A.

Further, with the structure illustrated in FIG. 12 and FIG. 13, the mounting stay 18 and the first and second bosses 430a and 430b have the function of reinforcing the bonding between the motor case main body 431 and the motor-side port block 432, thereby effectively preventing the hydraulic fluid from being leaked through the bonding portion between the motor case main body 431 and the motor-side port block 432.

Figure 14:
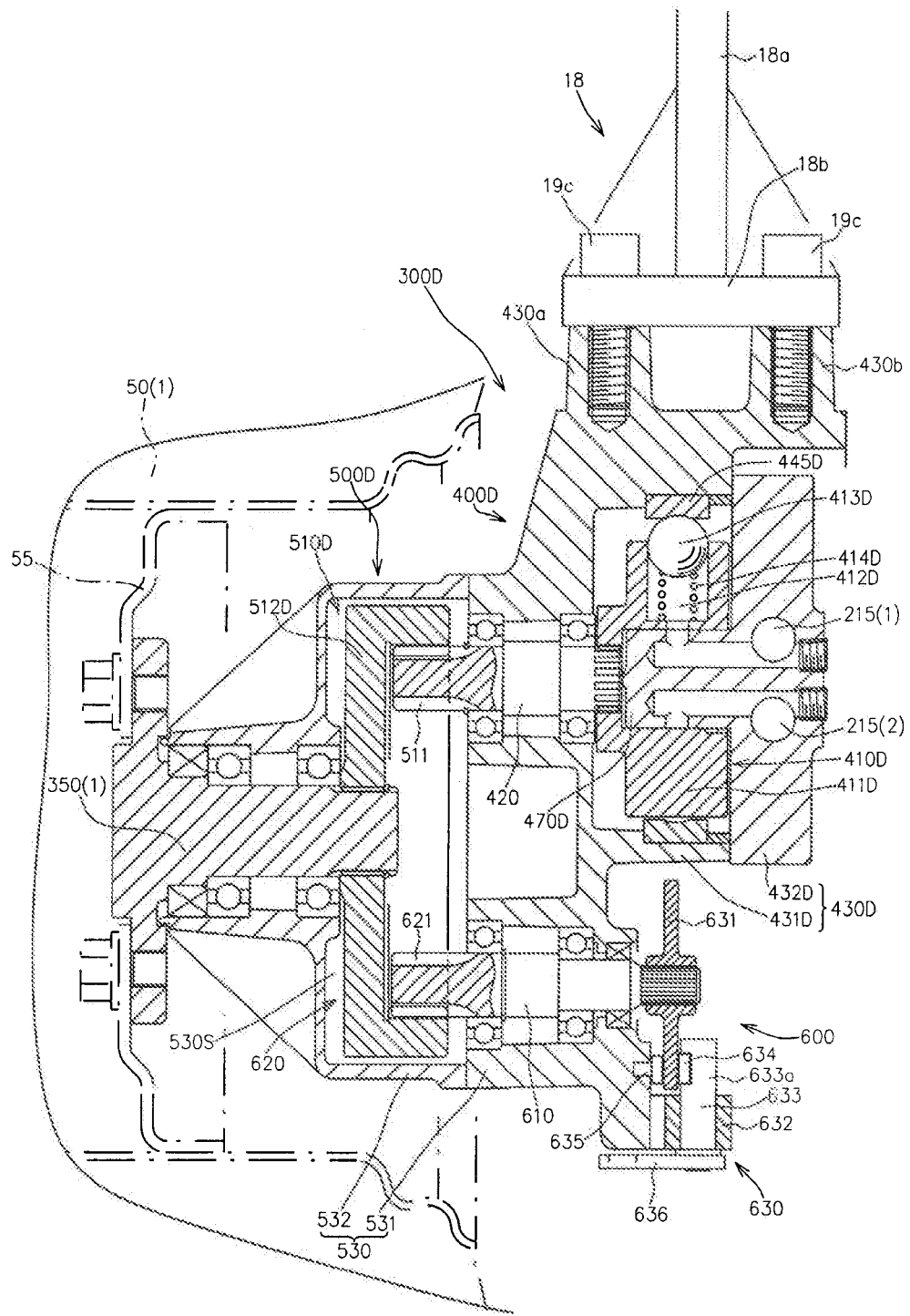
FIG. 14 is a vertical cross-sectional view of a wheel motor device according to another modified embodiment of the present invention.

FIG. 14 illustrates a vertical cross-sectional view of a wheel motor device 300D according to another modified embodiment of the present invention.

In FIG. 14, the components same as those in the above-explained embodiments and modified embodiment are designated by the same reference characters and detailed description there of will not be repeated.

The wheel motor device 300D is mainly different from the wheel motor device 300A according to the first embodiment in that the hydraulic motor main body 410 is replaced with a hydraulic motor main body 410D of a radial piston type and in that the speed-reduction gear mechanism 510 is replaced with a speed-reduction gear mechanism 510D.

Specifically, the wheel motor device 300D includes a hydraulic motor unit 400D including the hydraulic motor main body 410D, a speed-reduction gear unit 500D including the speed-reduction gear mechanism 510D, and the output member (the first output member 350(1) in the illustrated embodiment) for outputting, to the corresponding driving wheel (the first driving wheel 50(1) in the illustrated embodiment), the rotational power whose speed has been reduced by the speed-reduction gear mechanism 510D.

The hydraulic motor unit 400D includes, as shown in FIG. 14, the hydraulic motor main body 410D of a radial piston type, the motor shaft 420 supporting the hydraulic motor main body 410D in a relatively non-rotatable manner, and a motor case 430D which supports the motor shaft 420 in a rotatable manner about the axis line and which accommodates the hydraulic motor main body 410D.

The hydraulic motor main body 410D includes a cylinder block 411D connected to the motor shaft 420 in a relatively non-rotatable manner.

The cylinder block 411D is supported in a rotatable manner around its axis line on a support shaft 470D, which is provided at the motor case 430D so as to be positioned coaxially with the motor shaft 420.

The cylinder block 411D includes plural cylinder chambers 412 which are disposed around the axis line and each of which extends in a radial direction so as to have a first end opened to an inner circumferential surface of the cylinder block 411D that is in contact with the support shaft 470D and a second end opened to an outer circumferential surface of the cylinder block 411D.

The hydraulic motor main body 410D further includes plural piston members 413D respectively accommodated in the plural cylinder chambers 412 in a reciprocating manner along a radial direction with the axis line as a reference.

In the present modified embodiment, the hydraulic motor main body 410D further includes plural biasing members 414D that respectively press the plural piston members 413D radially outward.

The end on a radially outward side of the movable range of the plural piston members 413D is defined by a thrust ring 445D provided in the motor case 430D.

Specifically, the cylindrical thrust ring 445D is accommodated in the motor case 430D so as to surround the cylinder block 411D. That is, the cylinder block 411D is inserted into the thrust ring 445D in a state of being supported by the support shaft 470D in a relatively rotatable manner.

In the present modified embodiment, the thrust ring 445D has an inner circumferential surface having a substantially circular shape as viewed along the axis line, and is fixed in an immovable manner in a state of being eccentric with respect to the cylinder block 411D.

The wheel motor device 300D includes the hydraulic motor main body 410D of a radial piston type as described above, thereby realizing miniaturization of the wheel motor device 300D in the vehicle-widthwise direction, in comparison with the wheel motor device 300 including the hydraulic motor main body 410 of an axial piston type.

The motor case 430D is formed with the first motor-side hydraulic fluid channel 215(1) which experiences a higher pressure at a time of the forward movement of the vehicle and the second motor-side hydraulic fluid channel 215(2) which experiences a higher pressure at a time of the rearward movement of the vehicle.

The wheel motor device 300D according to the present modified embodiment includes the hydraulic motor main body 410D of a radial piston type, as described above.

Therefore, the first motor-side hydraulic fluid channel 215(1) has a first end opened to the outer surface of the motor case 430D to form the first motor-side hydraulic fluid port 216(1) and second ends branched so as to be fluidly connected to half of the plural cylinder chambers 412D.

Similarly, the second motor-side hydraulic fluid channel 215(2) has a first end opened to the outer surface of the motor case 430D to form the second motor-side hydraulic fluid port 216(2) and second ends branched so as to be fluidly connected to a remaining half of the plural cylinder chambers 412D.

The motor case 430D includes a motor case main body 431D that surround the hydraulic motor main body 410D and that forms an opening having a size that allows the hydraulic motor main body 410D to pass therethrough, the thrust ring 445D provided in the motor case main body 431D through the opening, and a motor-side port block 432D detachably coupled to the motor case main body 431D in such a way as to close the opening in a liquid-tight manner.

In the present modified embodiment, the support shaft 470D is integrally formed with the motor-side port block 432D, and therefore, the first and second motor-side hydraulic fluid channels 215(1), 215(2) are formed in the motor-side port block 432D.

The wheel motor device 300D is supported in a hanged manner by the corresponding main frame 15 through the mounting stay 18, similarly to the wheel motor device 300C.

In the wheel motor device 300D, the first and second bosses 430a, 430b are provided at an upper surface of the motor case main body 431D, as shown in FIG. 14.

The speed-reduction gear unit 500D includes the speed-reduction gear mechanism 510D, and the gear case 530 which accommodates the speed-reduction gear mechanism 510D and which supports the first output member 350(1) in a rotatable manner around the axis line.

The speed-reduction gear mechanism 510D includes the driving-side gear 511 with a small diameter, and an output gear 512D with a large diameter which is provided on the first output member 350(1) so as to be engaged with the driving-side gear 511.

In the present modified embodiment, the output gear 512D is embodied by an internal gear.

The driven-side gear 621 provided at the brake shaft 610 is also engaged with the output gear 512D in form of the internal gear.

In the present modified embodiment, the output gear 512D that is engaged with the driving-side gear 511 to form the speed-reduction gear mechanism 510D and that is engaged with the driven-side gear 621 to form the speed-increasing gear mechanism 620 is embodied by the internal gear, as described above.

The wheel motor device 300D with the configuration makes it possible to have the positions of the axis lines of the motor shaft 420 and the brake shaft 610 come close to the position of the axis line of the output member while sufficiently ensuring a speed reducing ratio of the speed-reduction gear mechanism 510D and a speed increasing ratio of the speed-increasing gear mechanism 620, thereby realizing miniaturization of the wheel motor device 300D in a radial direction.

Finally, a wheel motor device 300E will be described.

Although the wheel motor device 300E is inferior to the wheel motor devices according to the above explained embodiments and modified embodiments in terms of the degree of freedom in designing the brake mechanism 600, it could ensure the free space at the center in the vehicle widthwise direction as much as possible while realizing miniaturization of the brake mechanism 600 as much as possible.

Figure 15:
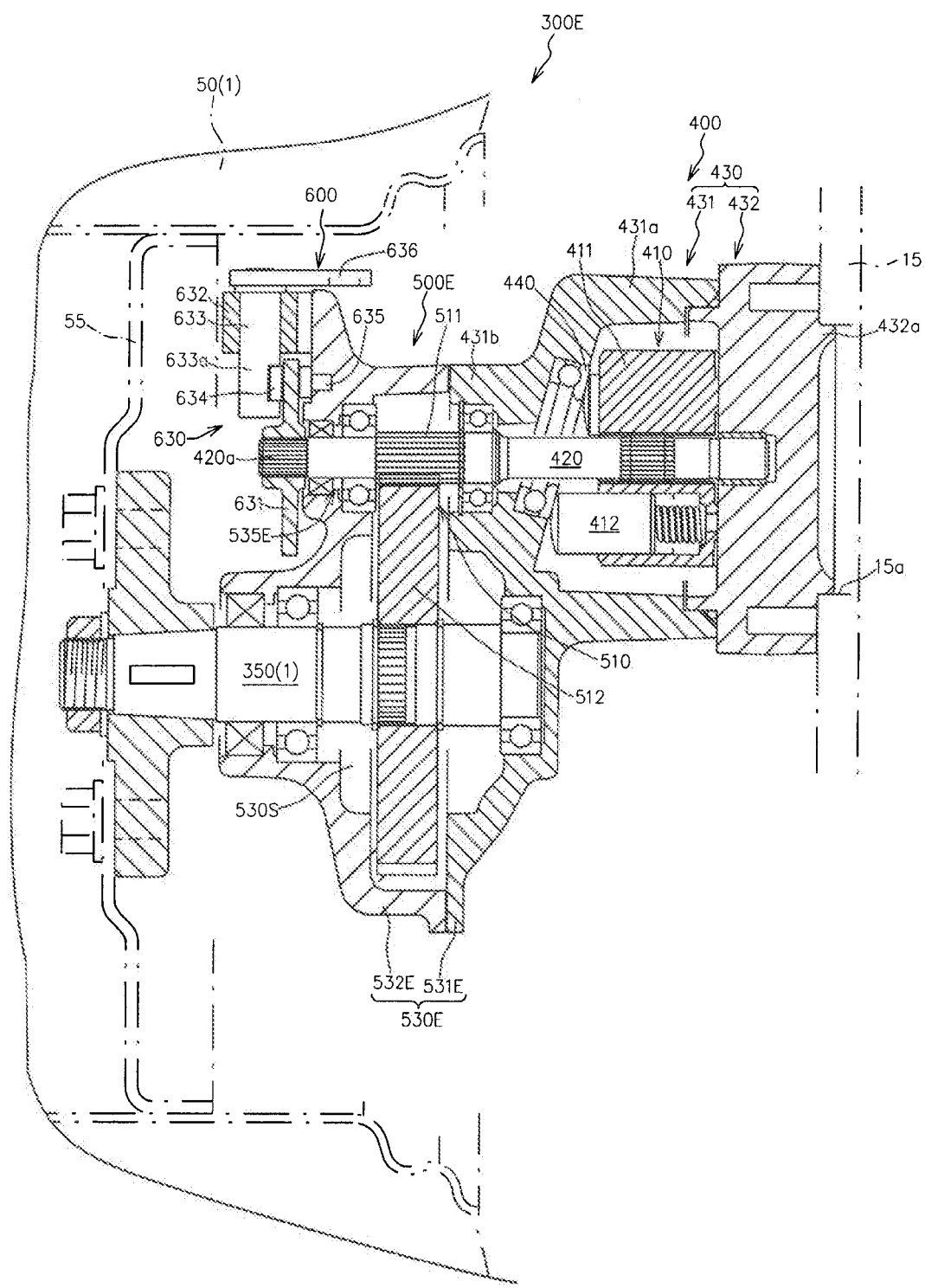
FIG. 15 is a vertical cross-sectional view of a wheel motor device according to still another modified embodiment of the present invention.

FIG. 15 illustrates a vertical cross-sectional view of the wheel motor device 300E.

In FIG. 15, the components same as those in the above-explained embodiments and modified embodiment are designated by the same reference characters and detailed description there of will not be repeated.

The wheel motor device 300E is different from the wheel motor devices according to the above-explained embodiments and modified embodiments in that the brake mechanism 600 is configured so as to apply the braking force to the motor shaft 420.

Specifically, the wheel motor device 300E includes the hydraulic motor unit 400, a speed-reduction gear unit 500E including the speed-reduction gear mechanism 510, and the output member (the first output member 350(1) in the illustrated embodiment) for outputting, to the corresponding driving wheel (the first driving wheel 50(1) in the illustrated embodiment), the rotational power whose speed has been reduced by the speed-reduction gear mechanism 510.

The speed-reduction gear unit 500E includes the speed-reduction gear mechanism 510, and a gear case 530E which accommodates the speed-reduction gear mechanism 510 and which supports the first output member 350 (1) in a rotatable manner around the axis line.

The gear case 530E includes an inner-side case body 531E connected to the motor case 430, and an outer-side case body 532E detachably coupled to the inner-side case body 531E so as to form the gear space 530S in cooperation therewith.

As in the above-explained embodiments and modified embodiments of the present invention, the inner-side case body 531E is integrally formed with the motor case 430.

The outer-side case body 532E is formed with a bearing hole 535E allowing a first end 420a of the motor shaft 420 on a side close to the corresponding driving wheel to extend outward, as shown in FIG. 15.

Specifically, in the wheel motor device 300E, the motor shaft 420 has the first end 420a on a side close to the corresponding driving wheel that extends outward from the outer-side case body 532E. The brake mechanism 600 is provided at an outer surface of the outer-side case body 552e on a side close to the corresponding driving wheel so as to apply the braking force to the first end 420a of the motor shaft 420.

Figure 16:
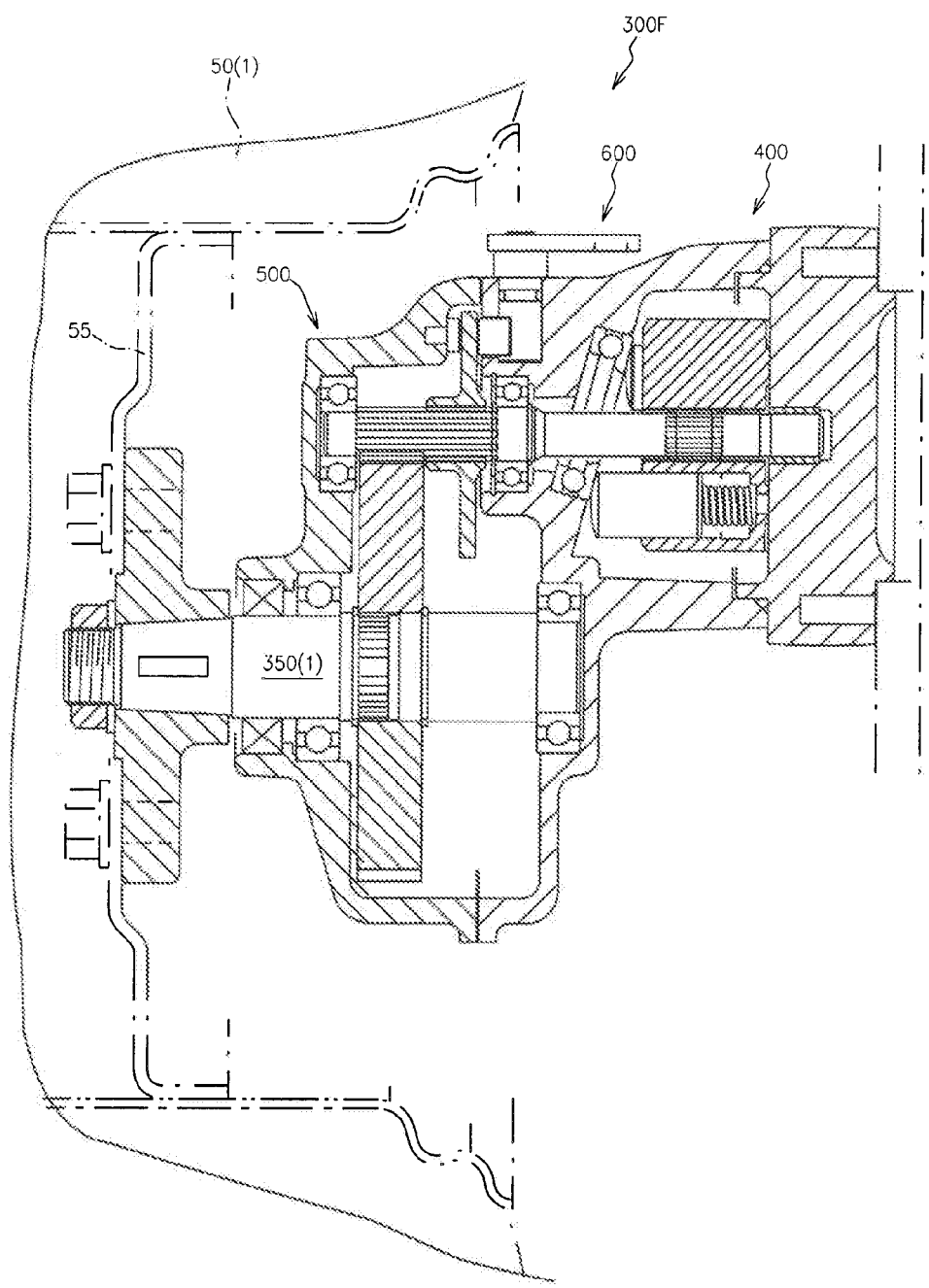
FIG. 16 is a vertical cross-sectional view of a wheel motor device according to a comparative example.

The thus configured wheel motor device 300E makes it possible to ensure the free space between the pair of wheel motor devices 300E larger than a wheel motor device 300F (see FIG. 16) in which the brake mechanism 300 is positioned between the hydraulic motor unit 400 and the speed-reduction gear unit 500 in the vehicle widthwise direction.

In the wheel motor device 300E, the brake mechanism 600 is preferably disposed within the wheel 55, as shown in FIG. 15.

According to the preferable arrangement, it is possible to have the wheel motor device 300E come close to the corresponding driving wheel in the vehicle widthwise direction as much as possible, thereby widening the free space as much as possible.

What is claimed is:

1. A wheel motor device applicable to a working vehicle including a driving power source, a hydraulic pump main body operatively driven by the driving source and a driving wheel, the wheel motor device comprising a hydraulic motor main body forming an HST in cooperation with the hydraulic pump main body, a motor shaft supporting the hydraulic motor main body in a relatively non-rotatable manner with respect thereto, an output member outputting toward the driving wheel the rotational power that has been operatively transmitted from the motor shaft, and a casing accommodating the hydraulic motor main body and supporting the motor shaft and the output member, wherein the casing includes a hollow-shaped motor case main body with an opening having a size that allows the hydraulic motor main body to pass therethrough, and a motor-side port block detachably coupled to the motor case main body along a direction parallel to the motor shaft so as to close the opening in a liquid-tight manner in a state where the hydraulic motor main body is accommodated within the motor case main body, wherein the motor case main body is integrally provided with a first frame mount boss having a first bolt hole opened in a direction orthogonal to the motor shaft, and wherein the motor-side port block is integrally provided with a second frame mount boss having a second bolt hole opened in the same direction as the first bolt hole.

2. A wheel motor device according to claim 1 further comprising a mounting stay that includes a horizontal portion, wherein the horizontal portion has such a length as to straddle both the first and second bosses and is connected to both the first and second bosses by fastening members inserted in the first and second bolt holes, and wherein the motor case main body and the motor-side port block are detachably connected to each other by the mounting stay as well as fastening members inserted in coupling holes along the direction parallel to the motor shaft.

3. A wheel motor device according to claim 2, wherein the mounting stay includes a vertical portion extending upward from the horizontal portion, and wherein the vertical portion is coupled to a main frame of the working vehicle through fastening members so that the wheel motor device is supported by the working vehicle.

4. A wheel motor device according to claim 1, wherein the first and second bosses are spaced from each other with respect to the direction parallel to the motor shaft.

* * * * *